(12) United States Patent
Hasegawa

(10) Patent No.: US 7,150,092 B2
(45) Date of Patent: Dec. 19, 2006

(54) METHOD FOR MANUFACTURING SPIN VALVE

(75) Inventor: Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 517 days.

(21) Appl. No.: 10/617,010

(22) Filed: Jul. 10, 2003

(65) Prior Publication Data

US 2004/0012898 A1    Jan. 22, 2004

Related U.S. Application Data

(62) Division of application No. 09/491,310, filed on Jan. 25, 2000, now Pat. No. 6,700,750.

(30) Foreign Application Priority Data

Jan. 27, 1999  (JP) ................. 11-019119

(51) Int. Cl.
  *G11B 5/193*  (2006.01)
  *C21D 1/34*  (2006.01)
(52) U.S. Cl. .............. 29/603.09; 29/603.08; 29/603.14; 148/108; 148/112
(58) Field of Classification Search ............. 29/603.08, 29/603.09, 603.07, 603.13, 603.14, 419.2; 360/324, 324.11, 324.12, 313, 314, 110; 148/108, 148/112, 121
See application file for complete search history.

(56) References Cited

U.S. PATENT DOCUMENTS 5,287,238 A    2/1994    Baumgart et al.

| 5,408,377 A | 4/1995 | Gurney et al. |
| 5,869,963 A | 2/1999 | Saito et al. |
| 6,181,533 B1 | 1/2001 | Pokhill |
| 6,355,115 B1 * | 3/2002 | Nagasaka et al. ........... 148/108 |
| 6,381,105 B1 | 4/2002 | Huai et al. |
| 6,449,134 B1 | 9/2002 | Beach et al. |
| 6,469,873 B1 | 10/2002 | Maruyama et al. |

FOREIGN PATENT DOCUMENTS

| JP | 6-223336 | 8/1994 |
| JP | 8-55312 | 2/1996 |
| JP | 10-91921 | 4/1998 |
| JP | 10-105928 | 4/1998 |
| JP | 11-185224 | * 7/1999 |

OTHER PUBLICATIONS

Copy of Notification of Reasons for Refusal dated Mar. 27, 2001 for corresponding Japanese Patent Application No. 11-019119.

* cited by examiner

*Primary Examiner*—A. Dexter Tugbang
(74) *Attorney, Agent, or Firm*—Brinks Hofer Gilson & Lione

(57) ABSTRACT

A method of manufacturing a spin-valve thin-film magnetic element is provided. The spin-valve thin-film magnetic element includes a free magnetic layer and laminates of pinned magnetic layers and antiferromagnetic layers formed on two surfaces of the free magnetic layer.

4 Claims, 12 Drawing Sheets

METHOD FOR MANUFACTURING SPIN VALVE

This application is a division of application Ser. No. 09/491,310, filed Jan. 25, 2000, now U.S. Pat. No. 6,700,750, which is hereby incorporated by reference herein.

BACKGROUND OF THE INVENTION

1. Field of the Invention

The present invention relates to a spin-valve thin-film magnetic element including a free magnetic layer and laminates of pinned magnetic layers and antiferromagnetic layers formed on two surfaces of the free magnetic layer, and to a method for making the spin-valve thin-film magnetic element.

2. Description of the Related Art

Magnetoresistive magnetic heads are classified into anisotropic magnetoresistive (AMR) heads provided with elements having anisotropic magnetoresistive effects and giant magnetoresistive (GMR) heads provided with elements having giant magnetoresistive effects. An AMR head has a single layer structure of a magnetic element exhibiting a magnetoresistive effect. In contrast, a GMR head is provided with a multi-layered element composed of a plurality of layers exhibiting an anisotropic magnetoresistive effect. Several structures have been proposed to produce giant magnetoresistive effects. A spin-valve thin-film magnetic element has a simple structure and a high rate of change of resistance to a weak external magnetic field. Spin-valve thin-film magnetic elements are classified into single spin-valve thin-film magnetic elements and dual spin-valve thin-film magnetic elements.

FIGS. 12 and 13 are schematic cross-sectional views of a conventional spin-valve thin-film element.

Shielding layers are formed above and below the spin-valve thin-film element with gap layers therebetween, and a GMR head for reading is composed of the spin-valve thin-film element, the gap layers, and the shielding layers. An inductive head for recording may be deposited on the GMR head for reading.

The GMR head and the inductive head are provided at a trailing end of a floating slider and constitute a thin-film magnetic head. The GMR head detects recorded magnetic fields on magnetic recording media, such as hard disks. In FIGS. 12 and 13, a magnetic recording medium moves in the Z direction and a fringing magnetic field is generated in the Y direction from the recording magnetic medium.

The spin-valve thin-film magnetic element 3 shown in FIG. 12 is a so-called dual spin-valve thin-film magnetic element in which a nonmagnetic conductive layer, a pinned magnetic layer, and an antiferromagnetic layer are deposited on each of two surfaces of a free magnetic layer.

The dual spin-valve thin-film magnetic element includes two groups of triple-layer configurations, each including a free magnetic layer, a nonmagnetic conductive layer, and a pinned magnetic layer. Thus, this element has a large rate of change of resistance compared to a single spin-valve thin-film magnetic element having a single group of the triple-layer configuration including the free magnetic layer, the nonmagnetic conductive layer, and the pinned magnetic layer, and can be used in high-density recording.

In the spin-valve thin-film magnetic element 3 shown in FIGS. 12 and 13, an underlying layer 10, a second antiferromagnetic layer 11, a second pinned magnetic layer 12, a nonmagnetic conductive layer 13, a free magnetic layer 14 composed of Co films 15 and 17 and a NiFe alloy film 16, a nonmagnetic conductive layer 18, a first pinned magnetic layer 19, a first antiferromagnetic layer 20, and a protective layer 21 are deposited in that order from the bottom of the drawings.

As shown in FIG. 13, biasing layers 130 and conductive layers 131 are formed on two sides of the laminate over the underlying layer 10 to the protective layer 21.

The first and second pinned magnetic layers 19 and 12, respectively, are formed of, for example, a Co film, a NiFe alloy, a CoNiFe alloy, or a CoFe alloy.

The first and second antiferromagnetic layers 20 and 11, respectively, are formed of a PtMn alloy, an XMn alloy wherein X is at least one metal selected from Pd, Ir, Rh, Ru and Os, or a PtMnZ alloy wherein Z is at least one element selected from Pd, Ir, Rh, Ru, Os, Au, Ag, Cr, Ni, Ne, Ar, Xe and Kr.

The first pinned magnetic layer 19 and the second pinned magnetic layer 12 in FIG. 12 are magnetized at interfaces with the first and second antiferromagnetic layers 20 and 11, respectively, by exchange anisotropic magnetic fields by exchange coupling (unidirectional exchange coupling magnetic fields), and the magnetization vectors are fixed in the Y direction in the drawing, that is, a direction (height direction) away from the recording medium.

The free magnetic layer 14 is aligned in a single-domain state by a magnetic flux from the biasing layers 130, and the magnetization is aligned in the X direction in the drawing, which is perpendicular to the magnetization vector of the first and second pinned magnetic layers 19 and 12, respectively.

Since the free magnetic layer 14 is aligned to a single-domain state by the biasing layers 130, the generation of Barkhausen noise is avoidable.

In the spin-valve thin-film magnetic element 3, when stationary currents flow from one conductive layer 131 to the free magnetic layer 14, the nonmagnetic conductive layers 18 and 13, respectively, and the first and second pinned magnetic layers 19 and 12, and when a fringing magnetic field is applied in the Y direction from the magnetic recording medium, which moves in the Z direction, the magnetization of the free magnetic layer 14 changes from the X direction to the Y direction. Such a change in magnetization vector in the free magnetic layer 14 causes a change in electrical resistance of the element in relation to the magnetization vector of the first and second pinned magnetic layers 19 and 12, respectively. The fringing magnetic field from the magnetic recording medium is detected as a change in voltage based on the change in electrical resistance.

In the production of this spin-valve thin-film magnetic element 3, individual layers from the underlying layer 10 to the protective layer 21 are deposited in that order, and are annealed in a magnetic field to generate exchange anisotropic fields at an interface between the first pinned magnetic layer 19 and the first antiferromagnetic layer 20 and at an interface between the second pinned magnetic layer 12 and the second antiferromagnetic layer 11 so that the first and second pinned magnetic layers 19 and 12, respectively, have the same magnetization vector (Y direction in the drawing).

In the conventional spin-valve thin-film magnetic element 3, as shown in FIG. 14, it is preferable that the magnetization vector ($H_3$) of the free magnetic layer 14 be perpendicular to the magnetization vectors ($H_1$ and $H_2$) of the first and second pinned magnetic layers 19 and 12, respectively, when an external magnetic field is not applied from the recording medium. However, dipolar magnetic fields ($H_4$ and $H_5$) leaking from the first and second pinned magnetic layers 19 and 12, respectively, enter the free magnetic layer 14 from the opposite direction to the Y direction. These dipolar magnetic fields ($H_4$ and $H_5$) tilt the magnetization vector ($H_3$) toward the vector ($H_6$) opposite to the Y direction, and thus preclude biasing adjustment for orienting the magnetization vector of the free magnetic layer 14. As a result, the magnetization vector ($H_6$) of the free magnetic layer 14 cannot be perpendicular to the magnetization vectors ($H_1$ and $H_2$) of the first and second pinned magnetic layers 19 and 12, respectively, and the regenerated waveform is inevitably asymmetric.

SUMMARY OF THE INVENTION

It is an object of the present invention to provide a spin-valve thin-film magnetic element which has no tilt of the magnetization vector of a free magnetic layer and can suppress asymmetry of the regenerated waveform.

It is another object of the present invention to provide a thin-film magnetic head having the spin-valve thin-film magnetic element.

It is a still another object of the present invention to provide a method for making the spin-valve thin-film magnetic element.

In a first aspect of the present invention, a spin-valve thin-film magnetic element includes a substrate, a laminate formed on the substrate, biasing layers, and conductive layers. The laminate includes a free magnetic layer; a first nonmagnetic conductive layer, a first pinned magnetic layer and a first antiferromagnetic layer deposited on the upper surface, away from the substrate, of the free magnetic layer; a second nonmagnetic conductive layer, a second pinned magnetic layer and a second antiferromagnetic layer deposited on the lower surface, near the substrate, of the free magnetic layer. The biasing layers orients the magnetization vector of the free magnetic layer in a direction perpendicular to the magnetization vector of the pinned magnetic layers, and the conductive layers supplies a sensing current to the free magnetic layer. The first antiferromagnetic layer adjoining the first pinned magnetic layer fixes the magnetization vector of the first pinned magnetic layer in one direction. The second antiferromagnetic layer adjoining the second pinned magnetic layer fixes the magnetization vector of the second pinned magnetic layer in a direction antiparallel to the magnetization vector of the first pinned magnetic layer. In addition, the first and second antiferromagnetic layers are composed of an alloy comprising Mn and at least one element selected from the group consisting of Pt, Pd, Ir, Rh, Ru, Os, Au, Ag, Cr, Ni, Ne, Ar, Xe and Kr.

This alloy contributes to generation of a large exchange anisotropic magnetic field which securely fixes the magnetization vectors of the first and second pinned magnetic layers. Moreover, the exchange anisotropic magnetic field has excellent temperature dependence. Thus, the resulting spin-valve thin-film magnetic element has superior linear response in magnetoresistive effects.

In an embodiment of the spin-valve thin-film magnetic element, the free magnetic layer comprises a nonmagnetic interlayer, and a first free magnetic layer and a second free magnetic layer formed on the two surfaces of the nonmagnetic interlayer, and the first free magnetic layer and the second free magnetic layer are antiferromagnetically coupled with each other so that the magnetization vectors of the first free magnetic layer and the second free magnetic layer are antiparallel to each other.

Preferable, the first antiferromagnetic layer comprises an alloy represented by the formula:

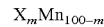
$$X_m Mn_{100-m}$$

wherein X is at least one metal selected from the group consisting of Pt, Pd, Ir, Rh, Ru and Os, and m is in a range of 52 atomic percent to 60 atomic percent.

Preferably, the second antiferromagnetic layer comprises an alloy represented by the formula:

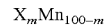
$$X_m Mn_{100-m}$$

wherein X is at least one metal selected from the group consisting of Pt, Pd, Ir, Rh, Ru and Os, and m is in a range of 48 atomic percent to 58 atomic percent.

Alternatively, the first antiferromagnetic layer may comprise an alloy represented by the formula:

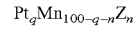
$$Pt_q Mn_{100-q-n} Z_n$$

wherein Z is at least one element selected from the group consisting of Au, Ag, Cr, Ni, Ne, Ar, Xe and Kr, and q and n satisfy the relationships (52 atomic percent)$\leq$(q+n)$\leq$(60 atomic percent) and (0.2 atomic percent)$\leq$n$\leq$(10 atomic percent).

Alternatively, the second antiferromagnetic layer may comprise an alloy represented by the formula:

$$Pt_q Mn_{100-q-n} Z_n$$

wherein Z is at least one element selected from the group consisting of Au, Ag, Cr, Ni, Ne, Ar, Xe and Kr, and q and n satisfy the relationships (48 atomic percent)$\leq$(q+n)$\leq$(58 atomic percent) and (0.2 atomic percent)$\leq$n$\leq$(10 atomic percent).

Alternatively, the first antiferromagnetic layer may comprise an alloy represented by the formula:

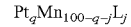
$$Pt_q Mn_{100-q-j} L_j$$

wherein L is at least one element selected from the group consisting of Pd, Ir, Rh, Ru and Os, and q and j satisfy the relationships (52 atomic percent)$\leq$(q+j)$\leq$(60 atomic percent) and (0.2 atomic percent)$\leq$j$\leq$(40 atomic percent).

Alternatively, the second antiferromagnetic layer may comprise an alloy represented by the formula:

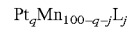
$$Pt_q Mn_{100-q-j} L_j$$

wherein L is at least one element selected from the group consisting of Pd, Ir, Rh, Ru and Os, and q and j satisfy the relationships (48 atomic percent)$\leq$(q+j)$\leq$(58 atomic percent) and (0.2 atomic percent)$\leq$j$\leq$(40 atomic percent).

According to another aspect of the present invention, a method for making a spin-valve thin-film magnetic element comprises: a laminate forming step for forming a laminate on a substrate, the laminate comprising a free magnetic layer, two nonmagnetic conductive layers formed on two surfaces of the free magnetic layer, first and second pinned magnetic layers adjoining the two nonmagnetic conductive layers, respectively, and first and second antiferromagnetic layers adjoining the first and second pinned magnetic layers, respectively, the first and second antiferromagnetic layers comprising Mn and at least one element selected from the group consisting of Pt, Pd, Ir, Rh, Ru, Os, Au, Ag, Cr, Ni, Ne, Ar, Xe and Kr; a first annealing step for annealing the laminate at a first annealing temperature while applying a first magnetic field to generate exchange anisotropic magnetic fields in the first and second antiferromagnetic layers so that the magnetization vectors of the first and second pinned magnetic layers are fixed in the same direction and so that the exchange anisotropic magnetic field of the second antiferromagnetic layer near the substrate is larger than the exchange anisotropic magnetic field of the first antiferromagnetic layer away from the substrate; and a second annealing step for annealing the laminate at a second annealing temperature higher than the first annealing temperature, while applying a second magnetic field, which is antiparallel to the first magnetic field, to fix the magnetization vector of the first pinned magnetic layer in a direction which is antiparallel to the magnetization vector of the second pinned magnetic layer.

Preferably, the magnitude of the second magnetic field is greater than that of the exchange anisotropic magnetic field of the first antiferromagnetic layer generated by the first annealing step and less than that of the exchange anisotropic magnetic field of the second antiferromagnetic layer generated by the first annealing step.

The first annealing temperature is preferably in a range of 220° C. to 250° C., and more preferably 220 to 240° C.

The second annealing temperature is preferably in a range of 250° C. to 270° C.

The magnetization vector of the first pinned magnetic layer is fixed to be antiparallel to the magnetization vector of the second pinned magnetic layer by such a method.

In addition, the magnetization vectors of the first and second pinned magnetic layers are fixed to be antiparallel to each other while fixing the magnetization vector of the second pinned magnetic layer without deterioration of the exchange anisotropic magnetic field of the second antiferromagnetic layer. Thus, the spin-valve thin-film magnetic element produced by this method has reduced asymmetry.

DESCRIPTION OF THE PREFERRED EMBODIMENTS

A first embodiment of the present invention will now be described with reference to the attached drawings.

Figure 1:
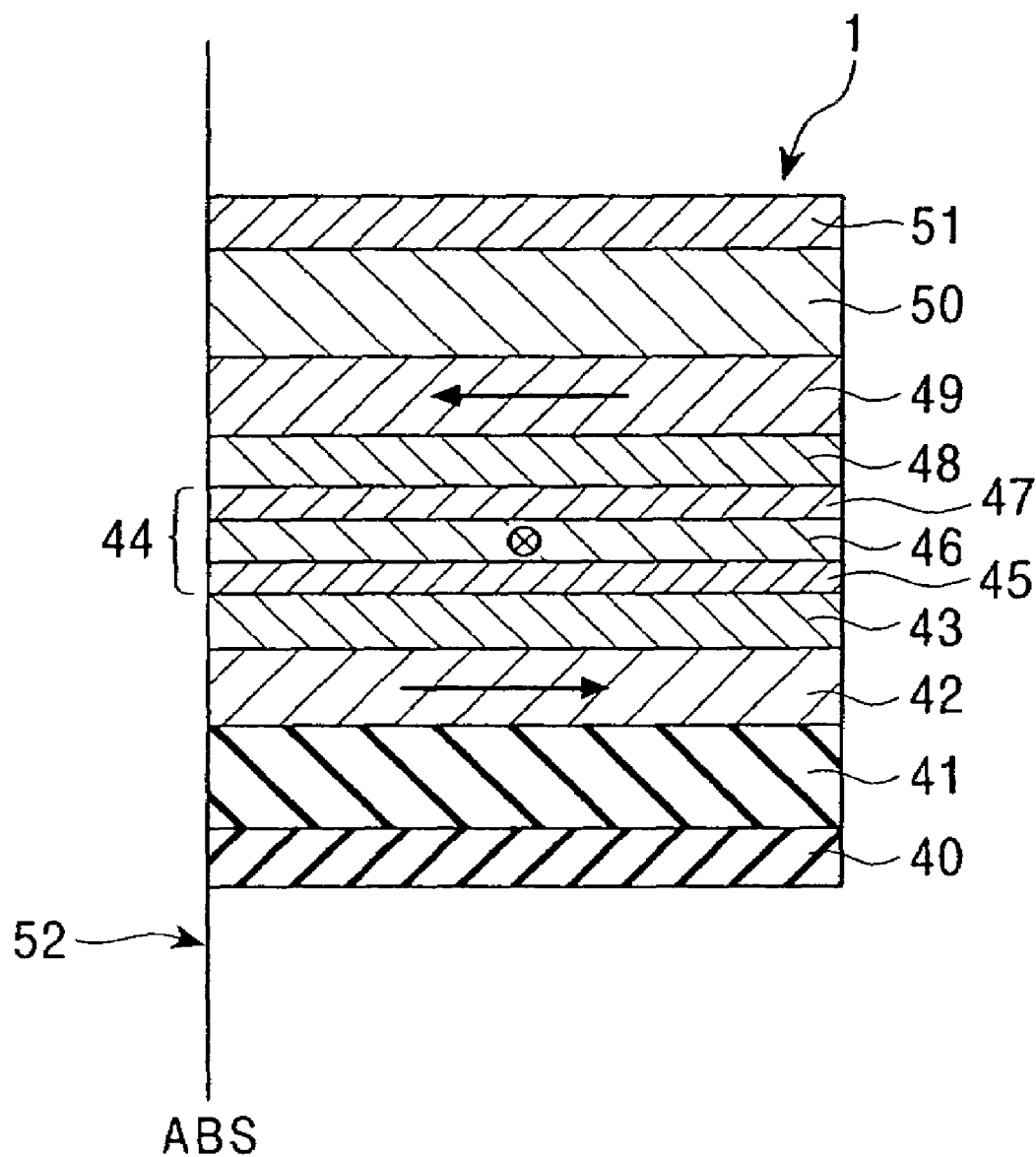
FIG. 1 is a cross-sectional view of a spin-valve thin-film magnetic element in accordance with a first embodiment of the present invention.
Figure 2:
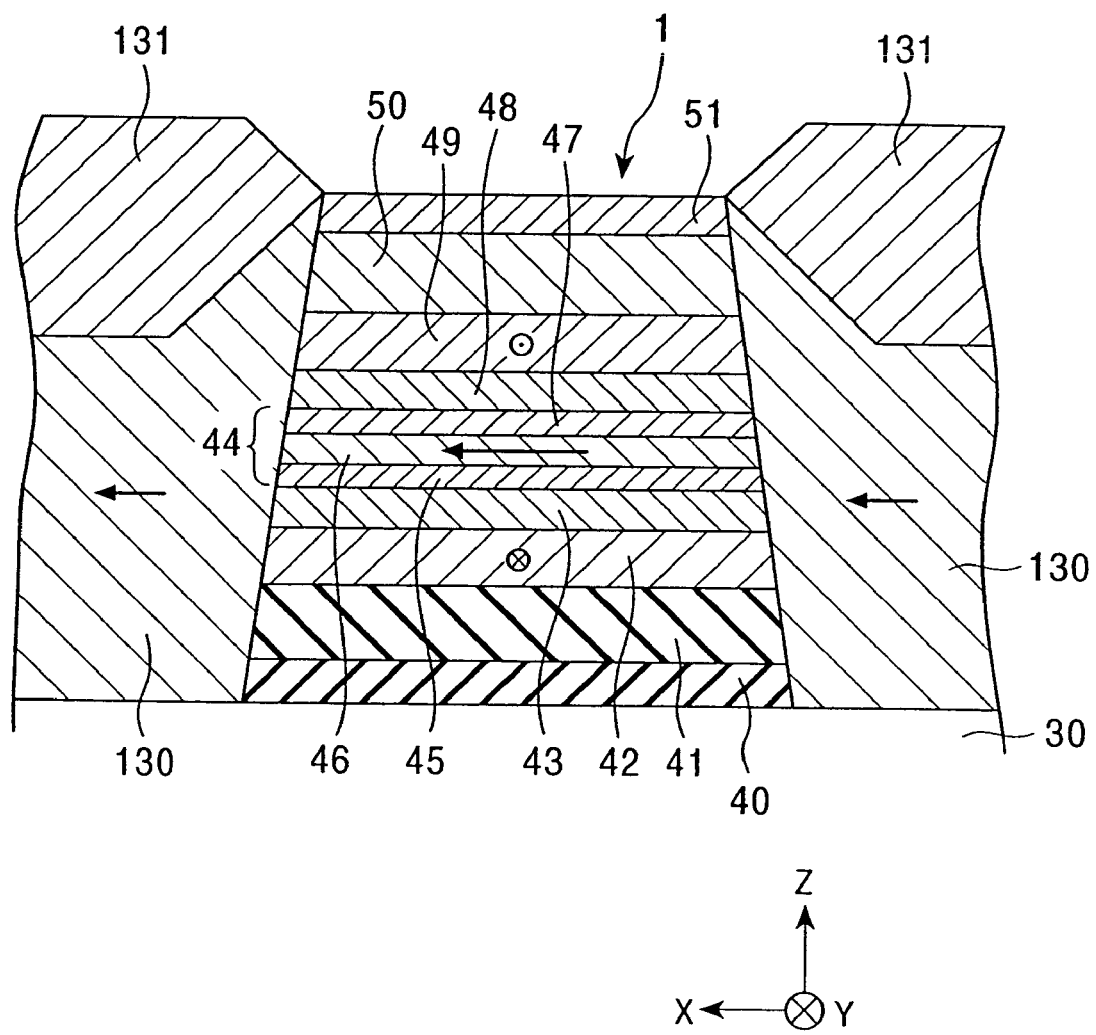
FIG. 2 is a cross-sectional view from another direction of the spin-valve thin-film magnetic element in FIG. 1.
Figure 4:
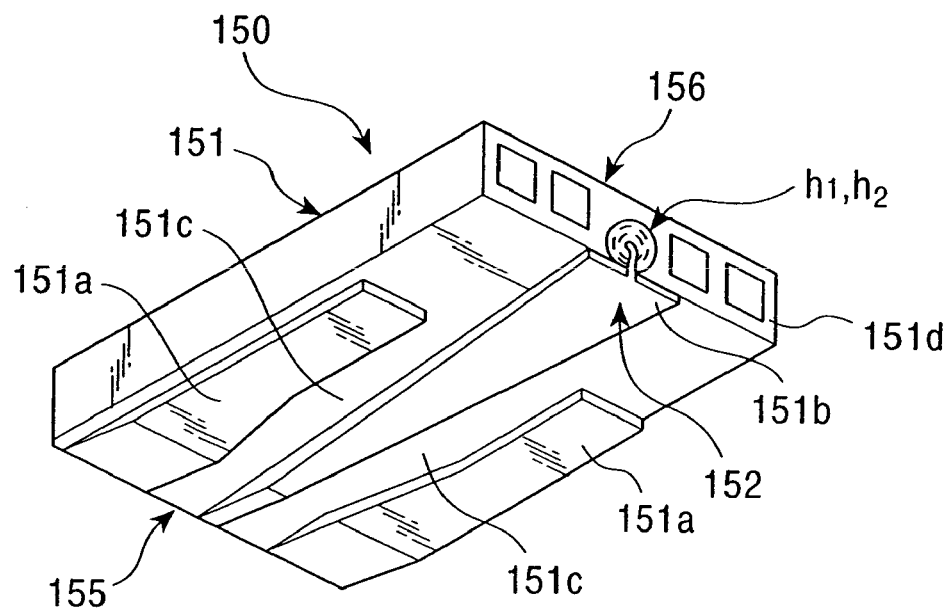
FIG. 4 is an isometric view of a thin-film magnetic head including the spin-valve thin-film magnetic element of the first embodiment.
Figure 5:
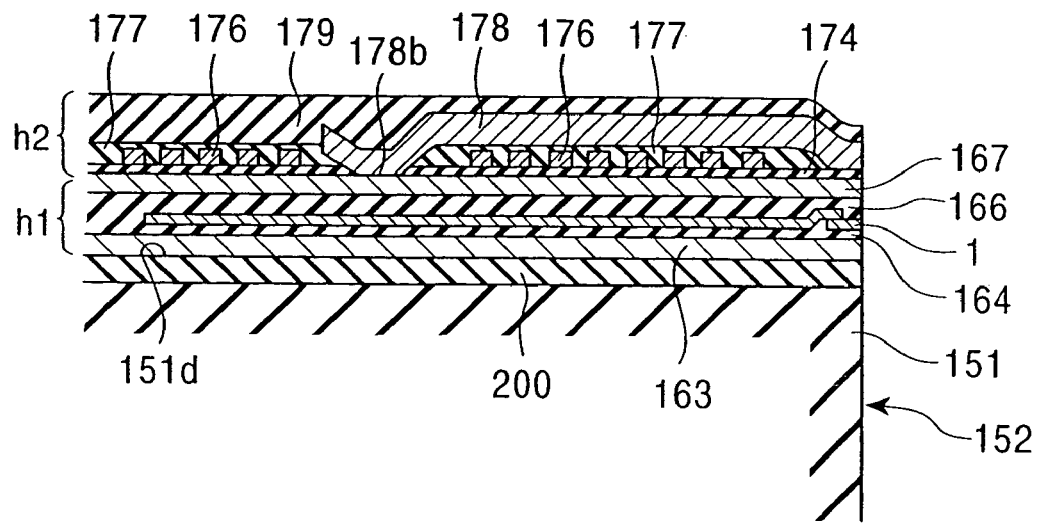
FIG. 5 is a cross-sectional view of the thin-film magnetic head in FIG. 4.

FIGS. 1 and 2 show a spin-valve thin-film magnetic element as a first embodiment of the present invention, and FIGS. 4 and 5 show a thin-film magnetic head provided with the spin-valve thin-film magnetic element of the present invention.

The thin-film magnetic head shown in FIGS. 4 and 5 has a GMR head $h_1$ for reading, which includes the spin-valve thin-film magnetic element shown in FIGS. 1 and 2, and shielding layers formed on the upper and lower surfaces of the spin-valve thin-film magnetic element. Gap layers isolate the spin-valve thin-film magnetic element from the shielding layers. An inductive head $h_2$ for recording may be deposited on the GMR head $h_1$ for reading.

Referring to FIG. 4, the GMR head $h_1$, having the spin-valve thin-film magnetic element, and the inductive head $h_2$ are disposed at a trailing end 151d of a slider 151 as a thin-film magnetic head 150 to detect recorded magnetic fields from magnetic recording media, such as hard disks. Numeral 155 represents the leading side which is upstream of the moving direction of the recording media and numeral 156 represents the trailing side. The slider 151 has rails 151a, 151b, and 151c on the surface which faces the recording media. Air grooves 151c are formed between these rails.

In FIGS. 1 and 2, magnetic recording media moves in the Z direction and the fringing magnetic field from the magnetic recording media is in the Y direction.

Referring to FIG. 5, the GMR head $h_1$ has a lower shielding layer 163 formed on the end face 151d of the slider 151 and composed of a magnetic alloy, a lower gap layer 164 deposited on the lower shielding layer 163, a spin-valve thin-film magnetic element 1 exposed to a medium-facing surface 152, an upper gap layer 166 covering the spin-valve thin-film magnetic element 1 and the lower gap layer 164, and an upper shielding layer 167 covering the upper gap layer 166. The upper shielding layer 167 also functions as a lower core layer for the inductive head $h_2$.

The inductive head $h_2$ includes the lower core layer (or the upper shielding layer) 167, a gap layer 174 deposited on the lower core layer 167, a coil 176, an upper insulating layer covering the coil 176, and an upper core layer 178 connected to the gap layer 174 and to the lower core layer 167 at the coil 176 side. The coil 176 has a planar spiral pattern. A base 178b of the upper core layer 178 is magnetically connected to the lower core layer 167 in the central region of the coil 176. The upper core layer 178 is covered with a protective film 179.

The spin-valve thin-film magnetic element 1 in accordance with the present invention has a dual spin-valve thin-film magnetic element in which a nonmagnetic conductive layer, a pinned magnetic layer, and an antiferromagnetic layer are deposited on each of two surfaces of a free magnetic layer. The dual spin-valve thin-film magnetic element has two triple-layer groups of a free magnetic layer, a nonmagnetic conductive layer and a pinned magnetic layer, and has a large rate of change of resistance compared to a single spin-valve thin-film magnetic element having a single triple-layer group of a free magnetic layer, a nonmagnetic conductive layer, and a pinned magnetic layer. Thus, the dual spin-valve thin-film magnetic element enables high-density recording.

With reference to FIGS. 1 and 2, the spin-valve thin-film magnetic element 1 has a substrate 30, an underlying film 40, a second antiferromagnetic layer 41, a second pinned magnetic layer 42, a nonmagnetic conductive layer 43, a free magnetic layer 44 composed of a Co film 45, a NiFe alloy film 46, and a Co film 47, a first pinned magnetic layer 49, a first antiferromagnetic layer 50, and a protective layer 51 in that order from the bottom in the drawings. Thus, the first antiferromagnetic layer 50 and the first pinned magnetic layer 49 are distant from the substrate 30, whereas the second antiferromagnetic layer 41 and the second pinned magnetic layer 42 are near the substrate 30. Biasing layers 130 and conductive layers 131 are formed on two sides of the laminate from the underlying layer 40 to the protective layer 51.

The first and second pinned magnetic layers 49 and 42, respectively, are composed of, for example, metallic Co, a NiFe alloy, a CoNiFe alloy, or a CoFe alloy.

The underlying layer 40 is composed of a nonmagnetic material such as Ta, the nonmagnetic conductive layers 43 and 48 are composed of a nonmagnetic conductive material, such as Cu, and the protective layer 51 is composed of a nonmagnetic material such as Ta.

The substrate 30 includes the slider 151 composed of, for example, an $Al_2O_3$—TiC ceramic, a nonmagnetic insulating underlying layer 200 composed of $Al_2O_3$ (alumina) and formed on the slider 151, the lower shielding layer 163 formed on the underlying layer 200, and the lower gap layer 164 formed on the lower shielding layer 163.

With reference to FIG. 1, the first pinned magnetic layer 49 and the second pinned magnetic layer 42 are in contact with the first antiferromagnetic layer 50 and the second antiferromagnetic layer 41, respectively. When these layers are annealed in a magnetic field, the first and second pinned magnetic layers 49 and 42, respectively, are magnetized by exchange anisotropic magnetic fields which are generated by exchange coupling at interfaces between the first pinned magnetic layer 49 and the first antiferromagnetic layer 50 and between the second pinned magnetic layer 42 and the second antiferromagnetic layer 41.

The free magnetic layer 44 is aligned to a single-domain state in the X direction by a magnetic flux from the biasing layers 130 which is perpendicular to the magnetization vectors of the first and second pinned magnetic layers 49 and 42, respectively. The free magnetic layer 44 in a single-domain state contributes to the reduction of Barkhausen noise.

The first and second antiferromagnetic layers 50 and 41, respectively, are composed of an alloy comprising Mn and at least one element selected from the group consisting of Pt, Pd, Ir, Rh, Ru, Os, Au, Ag, Cr, Ni, Ne, Ar, Xe and Kr. This alloy contributes to magnetization of the first and second pinned magnetic layers 49 and 42, respectively, as described above. Moreover, this alloy has significantly high corrosion resistance.

Preferably, the first antiferromagnetic layer 50 is an alloy represented by the formula:

$$X_m Mn_{100-m}$$

wherein X is at least one metal selected from the group consisting of Pt, Pd, Ir, Rh, Ru and Os, and m is in a range of 52 atomic percent to 60 atomic percent.

Preferably, the second antiferromagnetic layer 41 is an alloy represented by the formula:

$$X_m Mn_{100-m}$$

wherein X is at least one metal selected from the group consisting of Pt, Pd, Ir, Rh, Ru and Os, and m is in a range of 48 atomic percent to 58 atomic percent.

The first antiferromagnetic layer 50 may be composed of an alloy represented by the formula:

$$Pt_q Mn_{100-q-n} Z_n$$

wherein Z is at least one element selected from the group consisting of Au, Ag, Cr, Ni, Ne, Ar, Xe and Kr, and q and n satisfy the relationships (52 atomic percent)≦(q+n)≦(60 atomic percent) and (0.2 atomic percent)≦n≦(10 atomic percent).

The second antiferromagnetic layer 41 may be composed of an alloy represented by the formula:

$$Pt_q Mn_{100-q-n} Z_n$$

wherein Z is at least one element selected from the group consisting of Au, Ag, Cr, Ni, Ne, Ar, Xe and Kr, and q and n satisfy the relationships (48 atomic percent)≦(q+n)≦(58 atomic percent) and (0.2 atomic percent)≦n≦(10 atomic percent).

Alternatively, the first antiferromagnetic layer 50 may be composed of an alloy represented by the formula:

$$Pt_q Mn_{100-q-j} L_j$$

wherein L is at least one element selected from the group consisting of Pd, Ir, Rh, Ru and Os, and q and j satisfy the relationships (52 atomic percent)≦(q+j)≦(60 atomic percent) and (0.2 atomic percent)≦j≦(40 atomic percent).

Alternatively, the second antiferromagnetic layer 41 comprises an alloy represented by the formula:

$$Pt_q Mn_{100-q-j} L_j$$

wherein L is at least one element selected from the group consisting of Pd, Ir, Rh, Ru and Os, and q and j satisfy the relationships (48 atomic percent)≦(q+j)≦(58 atomic percent) and (0.2 atomic percent)≦j≦(40 atomic percent).

When the first antiferromagnetic layer 50 and the second antiferromagnetic layer 41 are composed of an alloy having the same composition, the alloy is preferably represented by the following formulae (1) to (3):

$$X_m Mn_{100-m} \qquad (1)$$

wherein X is at least one metal selected from the group consisting of Pt, Pd, Ir, Rh, Ru and Os, and m is in a range of 52 atomic percent to 58 atomic percent. Preferably, m is in a range of 52 atomic percent to 56.6 atomic percent, and most preferably 53.8 atomic percent to 55.2 atomic percent.

$$Pt_q Mn_{100-q-n} Z_n \qquad (2)$$

wherein Z is at least one element selected from the group consisting of Au, Ag, Cr, Ni, Ne, Ar, Xe and Kr, and q and n satisfy the relationships (52 atomic percent)≦(q+n)≦(60 atomic percent) and (0.2 atomic percent)≦n≦(10 atomic percent). Preferably, q and n satisfy the relationships (52 atomic percent)≦(q+n)≦(56.5 atomic percent) and (0.2 atomic percent)≦n≦(10 atomic percent), and most preferably, q and n satisfy the relationships (53.8 atomic percent) $\leq$(q+n)$\leq$(55.2 atomic percent) and (0.2 atomic percent) $\leq$n$\leq$(10 atomic percent).

$$Pt_qMn_{100-q-j}L_j \qquad (3)$$

wherein L is at least one element selected from the group consisting of Pd, Ir, Rh, Ru and Os, and q and j satisfy the relationships (52 atomic percent)$\leq$(q+j)$\leq$(58 atomic percent) and (0.2 atomic percent)$\leq$j$\leq$(40 atomic percent). Preferably, q and j satisfy the relationships (52 atomic percent)$\leq$(q+j)$\leq$(56.5 atomic percent) and (0.2 atomic percent)$\leq$j$\leq$(40 atomic percent), and most preferably, q and j satisfy the relationships (53.8 atomic percent)$\leq$(q+j)$\leq$(55.2 atomic percent) and (0.2 atomic percent)$\leq$j$\leq$(40 atomic percent).

When the first antiferromagnetic layer 50 and the second antiferromagnetic layer 41 are composed of different alloys having different compositions, the following combinations (4) to (6) are preferable.

Combination (4)

The first antiferromagnetic layer 50 is composed of an alloy represented by: $X_mMn_{100-m}$ wherein X is at least one metal selected from the group consisting of Pt, Pd, Ir, Rh, Ru and Os, and m is in a range of 52 atomic percent to 60 atomic percent, whereas the second antiferromagnetic layer 41 is composed of an alloy represented by: $X_mMn_{100-m}$ wherein X is at least one metal selected from the group consisting of Pt, Pd, Ir, Rh, Ru and Os, and m is in a range of 48 atomic percent to 58 atomic percent. More preferably, m in the second antiferromagnetic layer 41 is in a range of 52 atomic percent to 55.2 atomic percent or 56.5 atomic percent to 60 atomic percent.

Combination (5)

The first antiferromagnetic layer 50 is composed of an alloy represented by the formula: $Pt_qMn_{100-q-n}Z_n$ wherein Z is at least one element selected from the group consisting of Au, Ag, Cr, Ni, Ne, Ar, Xe and Kr, and q and n satisfy the relationships (52 atomic percent)$\leq$(q+n))$\leq$(60 atomic percent) and (0.2 atomic percent)$\leq$n$\leq$(10 atomic percent), whereas the second antiferromagnetic layer 41 is composed of an alloy represented by the formula: $Pt_qMn_{100-q-n}Z_n$ wherein Z is at least one element selected from the group consisting of Au, Ag, Cr, Ni, Ne, Ar, Xe and Kr, and q and n satisfy the relationships (48 atomic percent)$\leq$(q+n)$\leq$(58 atomic percent) and (0.2 atomic percent)$\leq$n$\leq$(10 atomic percent). Preferably, q and n in the second antiferromagnetic layer 41 satisfy the relationships (52 atomic percent)$\leq$(q+n)$\leq$(55.2 atomic percent) and (0.2 atomic percent)$\leq$n$\leq$(10 atomic percent), and most preferably the relationships (56.5 atomic percent)$\leq$(q+n)$\leq$(60 atomic percent) and (0.2 atomic percent)$\leq$n$\leq$(10 atomic percent).

Combination (6)

The first antiferromagnetic layer 50 is composed of an alloy represented by the formula: $Pt_qMn_{100-q-j}L_j$ wherein L is at least one element selected from the group consisting of Pd, Ir, Rh, Ru and Os, and q and j satisfy the relationships (52 atomic percent)$\leq$(q+j)$\leq$(60 atomic percent) and (0.2 atomic percent)$\leq$j$\leq$(40 atomic percent), whereas the second antiferromagnetic layer 41 is composed of an alloy represented by the formula: $Pt_qMn_{100-q-j}L_j$ wherein L is at least one element selected from the group consisting of Pd, Ir, Rh, Ru and Os, and q and j satisfy the relationships (48 atomic percent)$\leq$(q+j)$\leq$(58 atomic percent) and (0.2 atomic percent)$\leq$j$\leq$(40 atomic percent). Preferably, q and j in the second antiferromagnetic layer 41 satisfy the relationships (52 atomic percent)$\leq$(q+j)$\leq$(55.2 atomic percent) and (0.2 atomic percent)$\leq$j$\leq$(40 atomic percent), and more preferably, the relationships (56.5 atomic percent)$\leq$(q+j)$\leq$(60 atomic percent) and (0.2 atomic percent)$\leq$j$\leq$(40 atomic percent).

Figure 3:
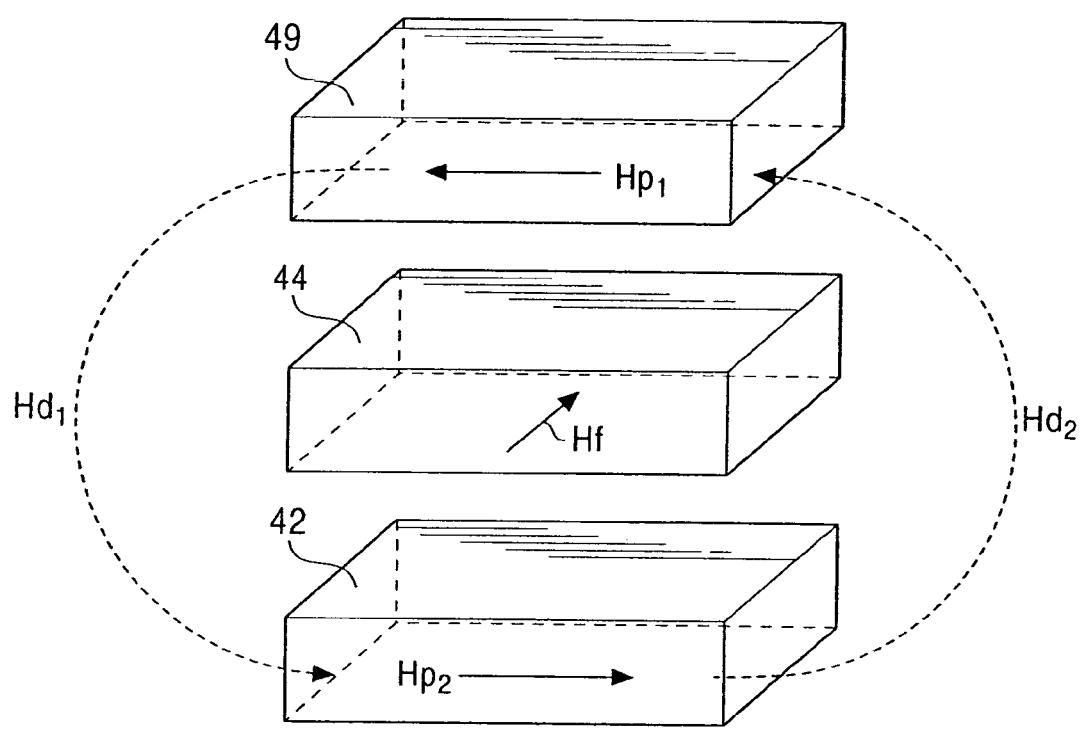
FIG. 3 is a schematic view illustrating the magnetization vectors of pinned magnetic layers and a free magnetic layer in the spin-valve thin-film magnetic element of the first embodiment.
Figure 3:
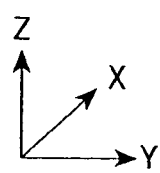

With reference to FIG. 3, in the spin-valve thin-film magnetic element 1 in accordance with the present invention, the magnetization vector $H_{p1}$ of the first pinned magnetic layer 49 is fixed in a direction opposite to the Y direction, whereas the magnetization vector $H_{p2}$ of the second pinned magnetic layer 42 is fixed in the Y direction. Thus, these magnetization vectors $H_{p1}$ and $H_{p2}$ are antiparallel to each other. The magnetization vector $H_f$ of the free magnetic layer 44 is oriented in the X direction by the magnetic flux from the biasing layer 130.

Vectors of dipolar magnetic fields $H_{d1}$ and $H_{d2}$ leaking from the first and second pinned magnetic layers 49 and 42, respectively, are antiparallel to each other in the free magnetic layer 44, and repel each other in the free magnetic layer 44. Thus, the magnetization vector $H_f$ of the free magnetic layer 44 is not affected by the magnetization vectors of the first and second pinned magnetic layers 49 and 42, respectively, and does not tilt. Accordingly, the free magnetic layer 44 can be readily biased.

The dipolar magnetic field $H_{d1}$ leaking from the first pinned magnetic layer 49 enters the second pinned magnetic layer 42, whereas the dipolar magnetic field $H_{d2}$ leaking from the second pinned magnetic layer 42 enters the first pinned magnetic layer 49. Since the first and second pinned magnetic layers 49 and 42, respectively, are magnetically coupled with each other, the magnetization vectors of these layers are not substantially affected and do not change by the external magnetic field.

In this spin-valve thin-film magnetic element 1, when a stationary current from the conductive layers 131 flows in the free magnetic layer 44, the nonmagnetic conductive layers 48 and 43, and the first and second pinned magnetic layers 49 and 42, respectively, and when a fringing magnetic field is applied in the Y direction from the magnetic recording medium moving in the Z direction, the magnetization vector of the free magnetic layer 44 changes from the X direction to the Y direction. Such a change in the magnetization vector of the free magnetic layer 44 causes a change in electrical resistance in relation to the magnetization vectors of the first and second pinned magnetic layers 49 and 42, respectively. Thus, the fringing magnetic field from the magnetic recording medium is detected as a change in voltage due to the change in current.

A method for making the spin-valve thin-film magnetic element in accordance with the present invention will now be described.

This method is based on the fact that the position of the antiferromagnetic layer in the spin-valve thin-film magnetic element or the relative position between the pinned magnetic layer and the antiferromagnetic layer determines the magnitude of the exchange anisotropic magnetic field of the antiferromagnetic layer generated by annealing. That is, a first annealing step fixes the magnetization vector of the second pinned magnetic layer and a second annealing step fixes the magnetization vector of the first pinned magnetic layer.

Figure 6:
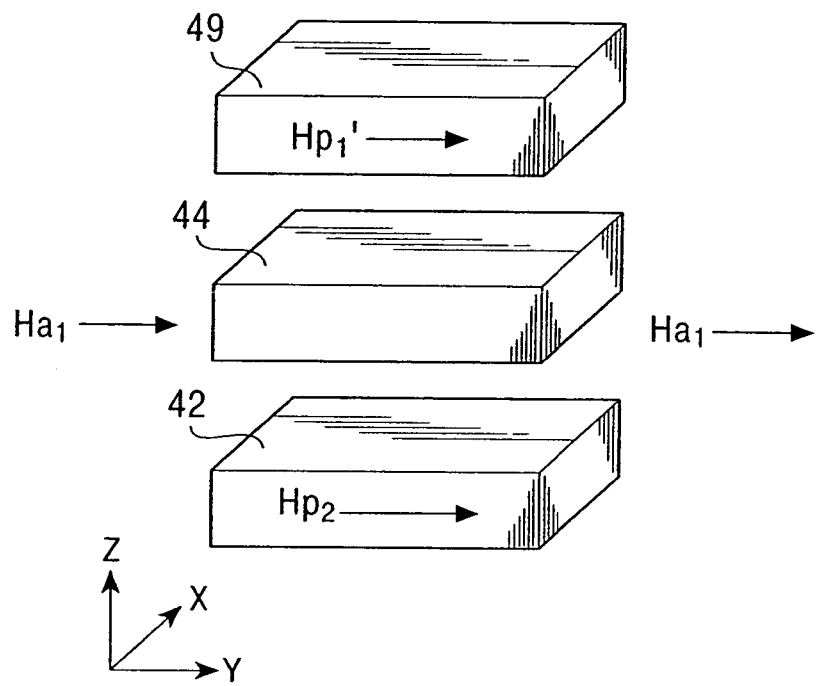
FIG. 6 is a schematic view showing a method for making a spin-valve thin-film magnetic element of the present invention.

In this method, as shown in FIGS. 1 and 2, a laminate is formed by depositing individual layers from the underlying layer 40 to the protective layer 51, in that order, and then, as shown in FIG. 6, the laminate is annealed at a first annealing temperature while applying a first magnetic field $H_{a1}$ in the Y direction at a first annealing temperature $T_{a1}$ so that exchange anisotropic magnetic fields $H_{p1}'$ and $H_{p2}$ are generated in the first and second antiferromagnetic layers 41 and 50, respectively (see FIGS. 1 and 2). Thus, the magnetization vectors of the first and second pinned magnetic layers 49 and 42, respectively, are fixed in the Y direction and the exchange anisotropic magnetic field $H_{p2}$ of the second antiferromagnetic layer 41 becomes larger than the exchange anisotropic magnetic field $H_{p1}'$ of the first antiferromagnetic layer 50.

Figure 7:
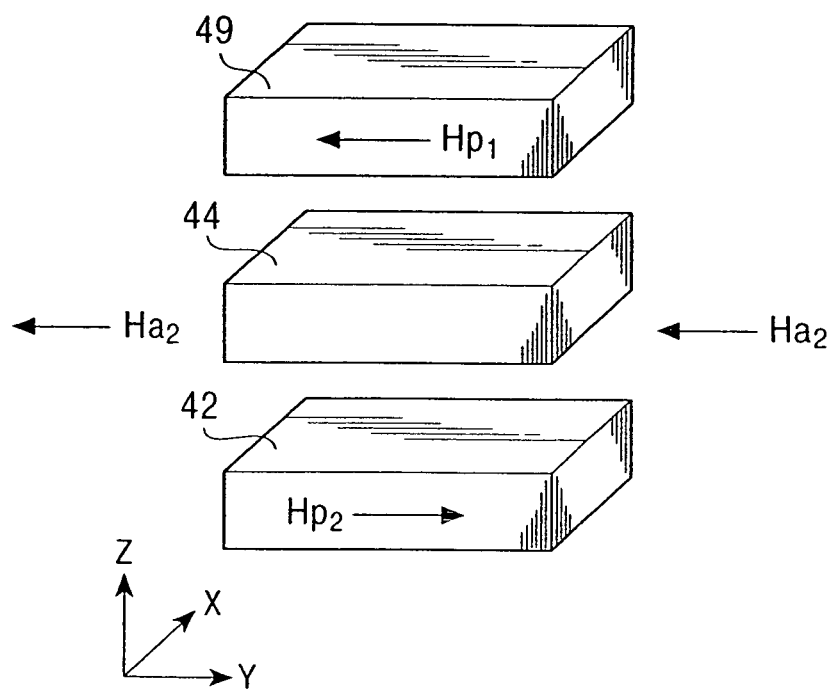
FIG. 7 is a schematic view showing a method for making a spin-valve thin-film magnetic element of the present invention.

With reference to FIG. 7, the laminate is annealed at a second annealing temperature $T_{a2}$ higher than the first annealing temperature $T_{a1}$ while applying a second magnetic field $H_{a2}$ in a direction opposite to the Y direction to change the exchange anisotropic magnetic field of the first antiferromagnetic layer 49 from $H_{p1}'$ to $H_{p1}$ and to fix the magnetization vector of the first pinned magnetic layer 49 in a direction opposite to the Y direction.

Figure 8:
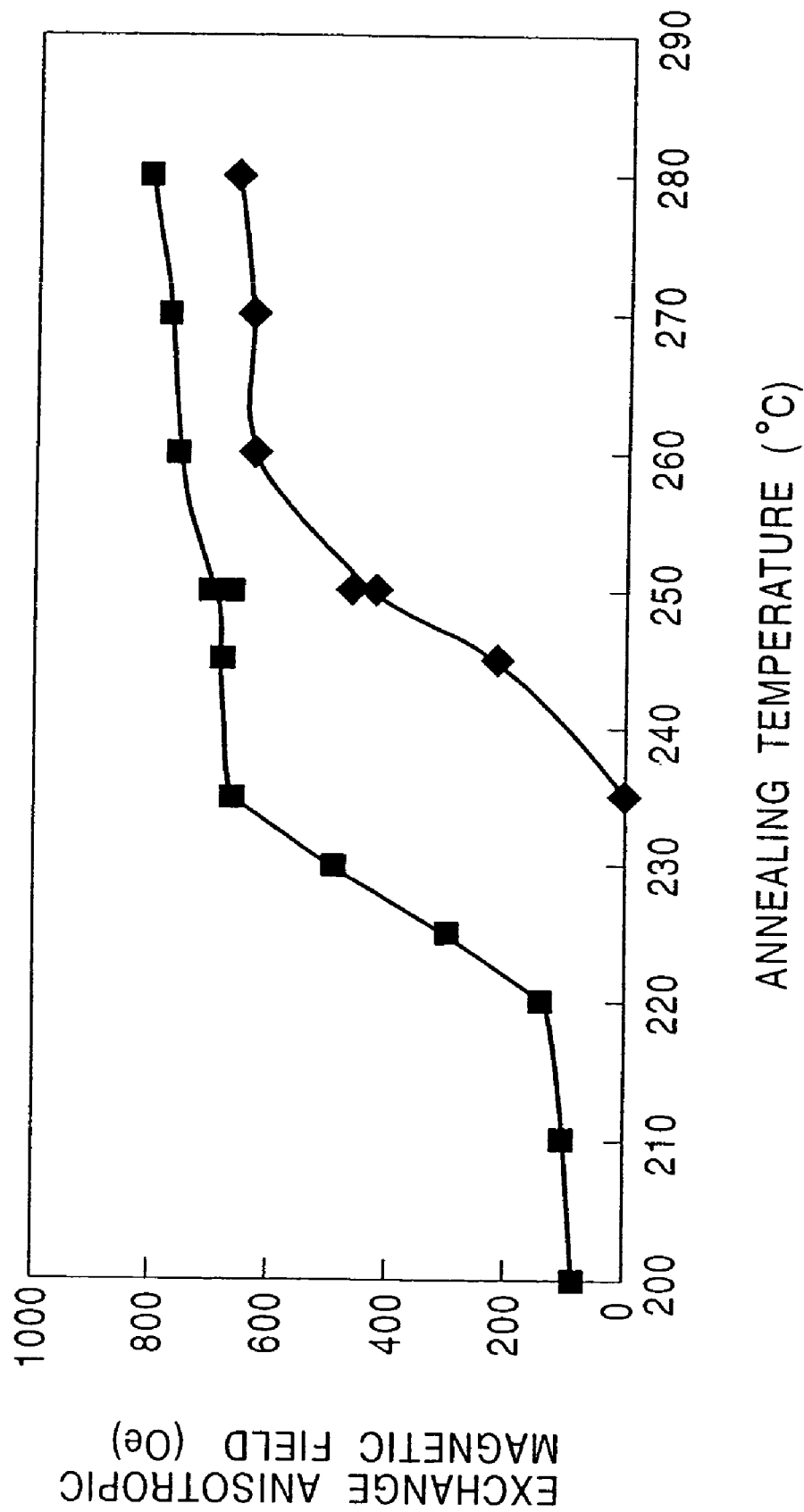
FIG. 8 is a graph of the dependence of the exchange anisotropic magnetic field on the annealing temperature in a $Pt_{55.4}Mn_{44.6}$ alloy and a $Pt_{54.4}Mn_{45.6}$ alloy.

FIG. 8 is a graph of the relationship between the annealing temperature of the antiferromagnetic layers and the exchange anisotropic magnetic field.

In the graph, the symbol ♦ represents a single spin-valve thin-film magnetic element having an antiferromagnetic layer disposed between a free magnetic layer and a protective layer or disposed above a pinned magnetic layer, whereas the symbol ■ represents a single spin-valve thin-film magnetic element having an antiferromagnetic layer disposed between a substrate and a free magnetic layer or disposed below a pinned magnetic layer.

Thus, the antiferromagnetic layer of the single spin-valve thin-film magnetic element represented by the symbol ♦ is more distant from the substrate compared to the single spin-valve thin-film magnetic element represented by the symbol ■.

In detail, the spin-valve thin-film magnetic element represented by the symbol ♦ includes a Si substrate, an $Al_2O_3$ layer (1000 angstroms), an underlying layer (Ta: 50 angstroms), a free magnetic layer (NiFe alloy: 70 angstroms and Co: 10 angstroms), a nonmagnetic electrically conductive layer (Cu: 30 angstroms), a pinned magnetic layer (Co: 25 angstroms), an antiferromagnetic layer ($Pt_{55.4}Mn_{44.6}$: 300 angstroms), and a protective layer (Ta: 50 angstroms).

On the other hand, the spin-valve thin-film magnetic element represented by the symbol ■ includes a Si substrate, an $Al_2O_3$ layer (1000 angstroms), an underlying layer (Ta: 30 angstroms), an antiferromagnetic layer ($Pt_{54.4}Mn_{45.6}$: 300 angstroms), a pinned magnetic layer (Co: 25 angstroms), a nonmagnetic electrically conductive layer (Cu: 26 angstroms), a free magnetic layer (Co: 10 angstroms and NiFe alloy: 70 angstroms), and a protective layer (Ta: 50 angstroms).

As shown in FIG. 8, the exchange anisotropic magnetic field of the antiferromagnetic layer ($Pt_{54.4}Mn_{45.6}$) represented by the symbol ■ starts to increase at 220° C. and becomes a constant value of approximately 700 Oe at 240° C. The exchange anisotropic magnetic field of the antiferromagnetic layer ($Pt_{55.4}Mn_{44.6}$) represented by the symbol ♦ starts to increase at 240° C. and becomes a constant value greater than 600 Oe at 260° C.

The antiferromagnetic layer (symbol ■) lying near the substrate or below the pinned magnetic layer shows a high exchange anisotropic magnetic field at a relatively low annealing temperature, compared to the antiferromagnetic layer (symbol ♦) lying distant from the substrate or above the pinned magnetic layer.

The method for making the spin-valve thin-film magnetic element in accordance with the present invention is based on these properties of the antiferromagnetic layer. The first pinned magnetic layer 49 and the first antiferromagnetic layer 50 are disposed at a position distant from the substrate 30, whereas the second pinned magnetic layer 42 and the second antiferromagnetic layer 41 are disposed near the substrate 30. The first pinned magnetic layer 49 distant from the substrate 30 lies below the first antiferromagnetic layer 50 whereas the second pinned magnetic layer 42 near the substrate 30 lies above the second antiferromagnetic layer 41.

When the above-described laminate is annealed at a first annealing temperature in a range of 220 to 250° C. while applying a first magnetic field, the exchange anisotropic magnetic fields of the first and second antiferromagnetic layers 50 and 41, respectively, fix the magnetization vectors of the first and second pinned magnetic layers 49 and 42, respectively, in the direction of the first magnetic field. Moreover, as shown in FIG. 8, the exchange anisotropic magnetic field of the second antiferromagnetic layer 41 near the substrate 30 is 600 Oe or more at 235° C., whereas the exchange anisotropic magnetic field of the first antiferromagnetic layer 50 distant from the substrate 30 is maintained at less than 200 Oe. Thus, the second antiferromagnetic layer 41 has a larger exchange anisotropic magnetic field than that of the first antiferromagnetic layer 50.

When the laminate is annealed at a second annealing temperature in a range of 250 to 270° C. while applying a second magnetic field which is antiparallel to the first magnetic field, the anisotropic exchange magnetic field of the first antiferromagnetic layer 50 is 600 Oe or more and the magnetization vector of the first pinned magnetic layer 49 is fixed in a direction antiparallel to the magnetization vector of the second pinned magnetic layer 42.

When the magnification of the second magnetic field is larger than the exchange anisotropic magnetic field of the first antiferromagnetic layer 50, which is generated during the first annealing step, the magnetization vector of the first pinned magnetic layer 49 can be fixed in a direction antiparallel to that of the second pinned magnetic layer 42.

Alternatively, when the second magnetic field is smaller than the exchange anisotropic magnetic field of the second antiferromagnetic layer 41, which is generated during the first annealing step, the magnetization vectors of the first and second pinned magnetic layers 49 and 42, respectively, can be fixed to be antiparallel to each other without deterioration of the exchange anisotropic magnetic field of the second antiferromagnetic layer 41 and without a change in the magnetization vector of the second pinned magnetic layer 42, even when the second magnetic field is applied to the second antiferromagnetic layer 41.

The first annealing temperature lies in a range of preferably 220° C. to 250° C., and more preferably 240 to 240° C. When the first annealing temperature is less than 220° C., the exchange anisotropic magnetic field of the second antiferromagnetic layer is 200 Oe or less, which is insufficient to enhance magnetization of the second pinned magnetic layer 42. As a result, the second pinned magnetic layer will be undesirably magnetized in the same direction as that of the first pinned magnetic layer 49 during the second annealing step. When the first annealing temperature exceeds 250° C., the exchange anisotropic magnetic field of the first antiferromagnetic layer 50 is large, which enhances magnetization of the first pinned magnetic layer 49. Thus, the magnetization vector of the first pinned magnetic layer 49 will not be fixed in a direction antiparallel to the magnetization vector of the second pinned magnetic layer 42 during the second annealing step.

More preferably, the first annealing temperature lies in a range of 230° C. to 250° C., because the second antiferromagnetic layer 41 has an exchange anisotropic magnetic field of 400 Oe or more, which contributes to enhanced stability of the magnetization vector of the second pinned magnetic layer 49.

Preferably, the second annealing temperature lies in a range of 250° C. to 270° C. When the second annealing temperature is less than 250° C., the magnetization of the first pinned magnetic layer 49 will not be enhanced since the exchange anisotropic magnetic field of the first antiferromagnetic layer 50 is smaller than 400 Oe. Moreover, the magnetization vector of the first pinned magnetic layer 49 fixed during the first annealing step will not fixed in a direction antiparallel to the magnetization vector of the second pinned magnetic layer 42.

When the second annealing temperature exceeds 270° C., the exchange anisotropic magnetic field of the first antiferromagnetic layer 50 is saturated at a constant level. Moreover, mutual diffusion between individual layers causing decreased magnetoresistive effects will occur at such a high temperature.

Figure 9:
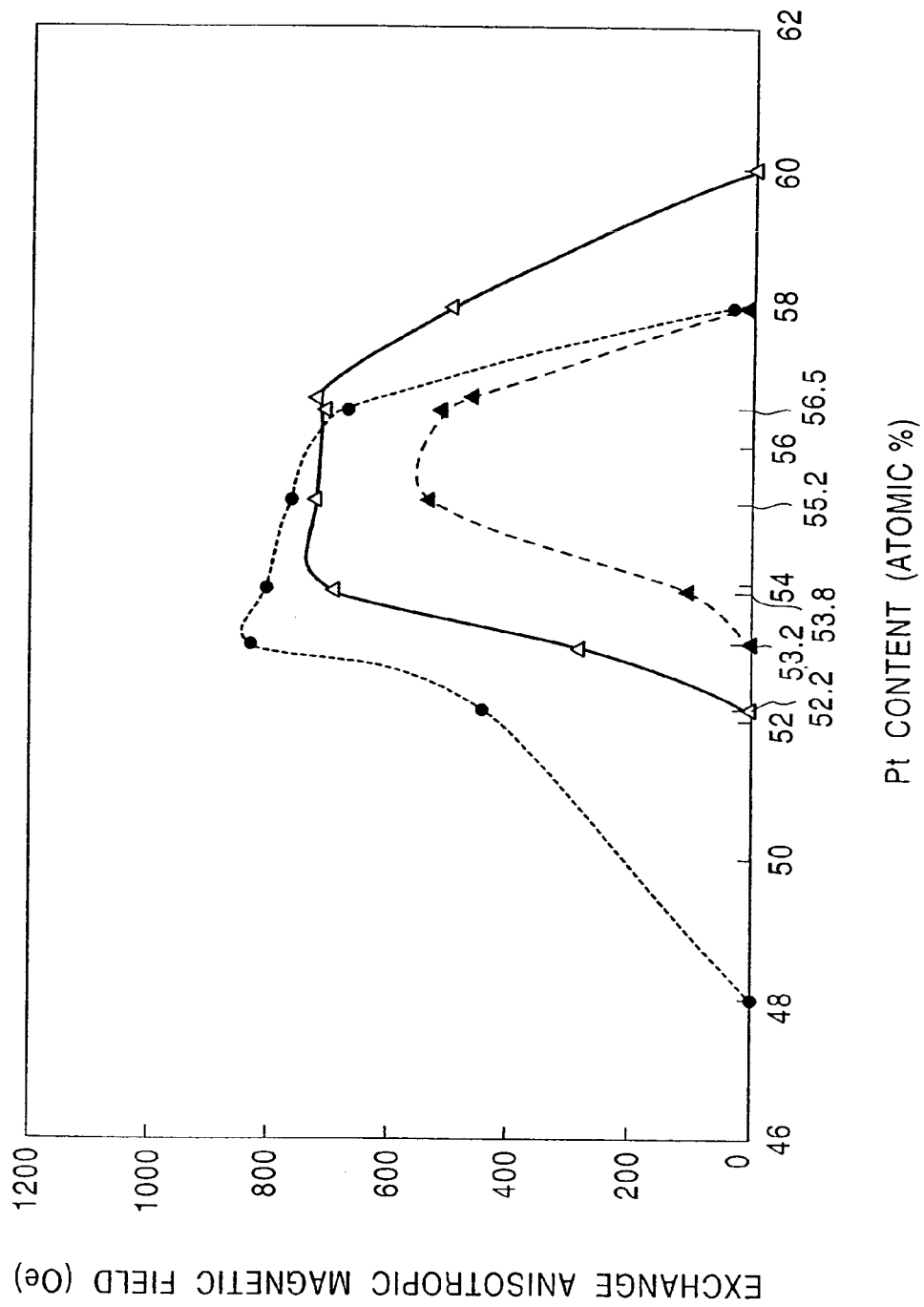
FIG. 9 is a graph of the dependence of the exchange anisotropic magnetic field on the Pt content in $Pt_mMn_{100-m}$ alloys.

FIG. 9 is a graph of the relationship between the composition of the antiferromagnetic layers and the exchange anisotropic magnetic field at various annealing temperatures. The symbol Δ indicates a single spin-valve thin-film magnetic element having an antiferromagnetic layer disposed at a position further from a substrate compared to a free magnetic layer or disposed on a pinned magnetic layer, in which the magnetic element is annealed at an annealing temperature of 270° C. The symbol ▲ indicates a single spin-valve thin-film magnetic element which is annealed at an annealing temperature of 245° C. The symbol ● indicates a single spin-valve thin-film magnetic element having an antiferromagnetic layer disposed between a substrate and a free magnetic layer or below a pinned magnetic layer, in which the magnetic element is annealed at an annealing temperature of 245° C.

In detail, each of the spin-valve thin-film magnetic elements represented by symbols Δ and ▲ includes a Si substrate, an $Al_2O_3$ layer (1000 angstroms), an underlying layer (Ta: 50 angstroms), a free magnetic layer (NiFe alloy: 70 angstroms and Co: 10 angstroms), a nonmagnetic electrically conductive layer (Cu: 30 angstroms), a pinned magnetic layer (Co: 25 angstroms), an antiferromagnetic layer ($Pt_mMn_r$: 300 angstroms), and a protective layer (Ta: 50 angstroms). On the other hand, the spin-valve thin-film magnetic element represented by the symbol ● includes a Si substrate, an $Al_2O_3$ layer (1000 angstroms), an underlying layer (Ta: 30 angstroms), an antiferromagnetic layer ($Pt_mMn_r$: 300 angstroms), a pinned magnetic layer (Co: 25 angstroms), a nonmagnetic electrically conductive layer (Cu: 26 angstroms), a free magnetic layer (Co: 10 angstroms and NiFe alloy: 70 angstroms), and a protective layer (Ta: 50 angstroms).

According to FIG. 9, in the spin-valve thin-film magnetic elements having first antiferromagnetic layers of an alloy represented by $X_mMn_{100-m}$ wherein X is at east one metal selected from Pt, Pd, Ir, Rh, Ru and Os, m preferably lies in a range of (52 atomic percent)$\leq$m$\leq$(60 atomic percent).

When m is less than 52 atomic percent or exceeds 60 atomic percent, the crystal lattice of the $X_mMn_{100-m}$ alloy will barely change into an L10-type ordered lattice during the first annealing step at 245° C. and the alloy will not have antiferromagnetism. As a result, a unidirectional exchange anisotropic magnetic field is not achieved.

Next, in the spin-valve thin-film magnetic elements having first antiferromagnetic layers of an alloy represented by $Pt_qMn_{100-q-n}Z_n$ wherein Z is at least one element selected from the group consisting of Au, Ag, Cr, Ni, Ne, Ar, Xe and Kr, q and n preferably satisfy the relationships (52 atomic percent)$\leq$(q+n))$\leq$(60 atomic percent) and (0.2 atomic percent)$\leq$n$\leq$(10 atomic percent).

When q+n is less than 52 atomic percent or exceeds 60 atomic percent, the crystal lattice of the $Pt_qMn_{100-q-n}Z_n$ alloy will barely change into an L10-type ordered lattice during the second annealing step at 270° C. and the alloy will not have antiferromagnetism. As a result, a unidirectional exchange anisotropic magnetic field is not achieved. When n is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

In the spin-valve thin-film magnetic elements having second antiferromagnetic layers of an alloy represented by $Pt_qMn_{100-q-n}Z_n$ wherein Z is at least one element selected from the group consisting of Au, Ag, Cr, Ni, Ne, Ar, Xe and Kr, q and n preferably satisfy the relationships (48 atomic percent)$\leq$(q+n)$\leq$(58 atomic percent) and (0.2 atomic percent)$\leq$n$\leq$(10 atomic percent).

When q+n is less than 48 atomic percent or exceeds 58 atomic percent, the crystal lattice of the $Pt_qMn_{100-q-n}Z_n$ alloy will barely change into an L10-type ordered lattice during the first annealing step at 245° C. and the alloy will not have antiferromagnetism. As a result, a unidirectional exchange anisotropic magnetic field is not achieved. When n is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

Next, in the spin-valve thin-film magnetic elements having first antiferromagnetic layers of an alloy represented by $Pt_qMn_{100-q-j}L_j$ wherein L is at least one element selected from the group consisting of Pd, Ir, Rh, Ru and Os, q and j preferably satisfy the relationships (52 atomic percent)$\leq$(q+j)$\leq$(60 atomic percent) and (0.2 atomic percent)$\leq$j$\leq$(40 atomic percent).

When q+j is less than 52 atomic percent or exceeds 60 atomic percent, the crystal lattice of the $Pt_qMn_{100-q-j}L_j$ alloy will barely change into an L10-type ordered lattice during the second annealing temperature at 270° C. and the alloy will not have antiferromagnetism. As a result, a unidirectional exchange anisotropic magnetic field is not achieved. When j is less than 0.2 atomic percent, the element L cannot contribute to a sufficient improvement in the unidirectional exchange anisotropic magnetic field. When j exceeds 40 atomic percent, the unidirectional exchange anisotropic magnetic field will undesirably decrease.

In the spin-valve thin-film magnetic elements having second antiferromagnetic layers of an alloy represented by $Pt_qMn_{100-q-j}L_j$ wherein L is at least one element selected from the group consisting of Pd, Ir, Rh, Ru and Os, q and j preferably satisfy the relationships (48 atomic percent)$\leq$(q+j)$\leq$(58 atomic percent) and (0.2 atomic percent)$\leq$j$\leq$(40 atomic percent).

When q+j is less than 48 atomic percent or exceeds 58 atomic percent, the crystal lattice of the $Pt_qMn_{100-q-j}L_j$ alloy will barely change into an L10-type ordered lattice during the first annealing temperature at 245° C. and the alloy will not have antiferromagnetism. As a result, a unidirectional exchange anisotropic magnetic field is not achieved. When j is less than 0.2 atomic percent, the element L cannot contribute to a sufficient improvement in the unidirectional exchange anisotropic magnetic field. When j exceeds 40 atomic percent, the unidirectional exchange anisotropic magnetic field will undesirably decrease.

In addition, according to FIG. 9, in the spin-valve thin-film magnetic elements having first antiferromagnetic layers and second antiferromagnetic layers of an alloy represented by $X_m Mn_{100-m}$ wherein X is at east one metal selected from Pt, Pd, Ir, Rh, Ru and Os, m preferably lies in a range of (52 atomic percent)$\leq$m$\leq$(58 atomic percent).

When m is less than 52 atomic percent, the crystal lattice of the $X_m Mn_{100-m}$ alloy constituting the first antiferromagnetic layer will barely change into an L10-type ordered lattice during the second annealing step at 270° C. and the alloy will not have antiferromagnetism. As a result, a unidirectional exchange anisotropic magnetic field is not achieved.

When m exceeds 58 atomic percent, the crystal lattice of the $X_m Mn_{100-m}$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

In the spin-valve thin-film magnetic element having first and second antiferromagnetic layers of the alloy represented by $X_m Mn_{100-m}$, m more preferably lies in a range of (52 atomic percent)$\leq$m$\leq$(56.5 atomic percent).

When m is less than 52 atomic percent, the crystal lattice of the $X_m Mn_{100-m}$ alloy constituting the first antiferromagnetic layer will barely change into an L10-type ordered lattice during the second annealing step at 270° C. and the alloy will not have antiferromagnetism. As a result, a unidirectional exchange anisotropic magnetic field is not achieved.

When m exceeds 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

In the spin-valve thin-film magnetic element having first and second antiferromagnetic layers of the alloy represented by $X_m Mn_{100-m}$, m most preferably lies in a range of 53.8 atomic percent$\leq$m$\leq$55.2 atomic percent.

When m is less than 53.8 atomic percent, the exchange anisotropic magnetic field of the second antiferromagnetic layer becomes larger than the exchange anisotropic magnetic field of the first antiferromagnetic layer by a large difference during the first annealing step at 245° C., and the exchange anisotropic magnetic field of the first antiferromagnetic layer is still lower than the exchange anisotropic magnetic field of the second antiferromagnetic layer after the second annealing step at 270° C. Thus, the magnitudes of the exchange anisotropic magnetic fields of the first and second antiferromagnetic layers are not equalized.

When m exceeds 55.2 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

Accordingly, when m in the first antiferromagnetic layer and the second antiferromagnetic layer satisfies the relationship (53.8 atomic percent)$\leq$m$\leq$(55.2 atomic percent), the exchange anisotropic magnetic field of the second antiferromagnetic layer becomes larger than the exchange anisotropic magnetic field of the first antiferromagnetic layer during the first annealing step and the difference in the exchange anisotropic magnetic fields between the first antiferromagnetic layer and the second antiferromagnetic layer decreases during the second annealing step. As a result, the magnitudes of the exchange anisotropic magnetic fields of the first and second antiferromagnetic layers can be substantially equalized.

In the spin-valve thin-film magnetic element having a first antiferromagnetic layer and a second antiferromagnetic layer of an alloy represented by $Pt_q Mn_{100-q-n} Z_n$ wherein Z is at least one element selected from the group consisting of Au, Ag, Cr, Ni, Ne, Ar, Xe and Kr, q and n preferably satisfy the relationships (52 atomic percent)$\leq$(q+n)$\leq$(58 atomic percent) and (0.2 atomic percent)$\leq$n$\leq$(10 atomic percent).

When q+n is less than 52 atomic percent, the crystal lattice of the $Pt_q Mn_{100-q-n} Z_n$ alloy will barely change into an L10-type ordered lattice during the second annealing step at 270° C. and the alloy will not have antiferromagnetism. As a result, a unidirectional exchange anisotropic magnetic field is not achieved.

When q+n exceeds 58 atomic percent, the crystal lattice of the $Pt_q Mn_{100-q-n} Z_n$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

When n is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

In the spin-valve thin-film magnetic element having the first and second antiferromagnetic layers of the alloy represented by $Pt_q Mn_{100-q-n} Z_n$, q and n more preferably satisfy the relationships (52 atomic percent)$\leq$(q+n)$\leq$(56.5 atomic percent) and (0.2 atomic percent)$\leq$n$\leq$(10 atomic percent).

When q+n is less than 52 atomic percent, the crystal lattice of the $Pt_q Mn_{100-q-n} Z_n$ alloy will barely change into an L10-type ordered lattice during the second annealing step at 270° C. and the alloy will not have antiferromagnetism. As a result, a unidirectional exchange anisotropic magnetic field is not achieved.

When q+n exceeds 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C.

Moreover, the magnetization vector of the first pinned magnetic layer will be barely fixed in a direction antiparallel to the magnetization vector of the second pinned magnetic layer during the second annealing step.

When n is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

In the spin-valve thin-film magnetic element having the first and second antiferromagnetic layers of the alloy represented by $Pt_qMn_{100-q-n}Z_n$, q and n most preferably satisfy the relationships (53.8 atomic percent)$\leq$(q+n)$\leq$(55.2 atomic percent) and (0.2 atomic percent)$\leq$n$\leq$(10 atomic percent).

When q+n is less than 53.8 atomic percent, the exchange anisotropic magnetic field of the second antiferromagnetic layer becomes larger than the exchange anisotropic magnetic field of the first antiferromagnetic layer by a large difference during the first annealing step at 245° C., and the exchange anisotropic magnetic field of the first antiferromagnetic layer is still lower than the exchange anisotropic magnetic field of the second antiferromagnetic layer after the second annealing step at 270° C. Thus, the magnitudes of the exchange anisotropic magnetic fields of the first and second antiferromagnetic layers are not equalized.

When q+n exceeds 55.2 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

When n is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

Accordingly, when q and n in the first antiferromagnetic layer and the second antiferromagnetic layer satisfy the relationships (53.8 atomic percent)$\leq$(q+n)$\leq$(55.2 atomic percent) and (0.2 atomic percent)$\leq$n$\leq$(10 atomic percent), the exchange anisotropic magnetic field of the second antiferromagnetic layer becomes larger than the exchange anisotropic magnetic field of the first antiferromagnetic layer during the first annealing step and the difference in the exchange anisotropic magnetic fields between the first antiferromagnetic layer and the second antiferromagnetic layer decreases during the second annealing step. As a result, the magnitudes of the exchange anisotropic magnetic fields of the first and second antiferromagnetic layers can be substantially equalized.

Next, in the spin-valve thin-film magnetic element having a first antiferromagnetic layer and a second antiferromagnetic layer of an alloy represented by $Pt_qMn_{100-q-j}L_j$ wherein L is at least one element selected from the group consisting of Pd, Ir, Rh, Ru and Os, q and j preferably satisfy the relationships (52 atomic percent)$\leq$(q+j)$\leq$(58 atomic percent) and (0.2 atomic percent)$\leq$j$\leq$(40 atomic percent).

When q+j is less than 52 atomic percent, the crystal lattice of the $Pt_qMn_{100-q-j}L_j$ alloy will barely change into an L10-type ordered lattice during the second annealing step at 270° C. and the alloy will not have antiferromagnetism. As a result, a unidirectional exchange anisotropic magnetic field is not achieved.

When q+j exceeds 58 atomic percent, the crystal lattice of the $Pt_qMn_{100-q-j}L_j$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

When j is less than 0.2 atomic percent, the element L cannot contribute to a sufficient improvement in the unidirectional exchange anisotropic magnetic field. When n exceeds 40 atomic percent, the unidirectional exchange anisotropic magnetic field will undesirably decrease.

In the spin-valve thin-film magnetic element having the first and second antiferromagnetic layers of the alloy represented by $Pt_qMn_{100-q-j}L_j$, q and j more preferably satisfy the relationships (52 atomic percent)$\leq$(q+j)$\leq$(56.5 atomic percent) and (0.2 atomic percent)$\leq$j$\leq$(40 atomic percent).

When q+j is less than 52 atomic percent, the crystal lattice of the $Pt_qMn_{100-q-j}L_j$ alloy will barely change into an L10-type ordered lattice during the second annealing step at 270° C. and the alloy will not have antiferromagnetism. As a result, a unidirectional exchange anisotropic magnetic field is not achieved.

When q+j exceeds 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

When j is less than 0.2 atomic percent, the element L cannot contribute to a sufficient improvement in the unidirectional exchange anisotropic magnetic field. When j exceeds 40 atomic percent, the unidirectional exchange anisotropic magnetic field will undesirably decrease.

In the spin-valve thin-film magnetic element having the first and second antiferromagnetic layers of the alloy represented by $Pt_qMn_{100-q-j}L_j$, q and j most preferably satisfy the relationships (53.8 atomic percent)$\leq$(q+j)$\leq$(55.2 atomic percent) and (0.2 atomic percent)$\leq$j$\leq$(40 atomic percent).

When q+j is less than 53.8 atomic percent, the exchange anisotropic magnetic field of the second antiferromagnetic layer becomes larger than the exchange anisotropic magnetic field of the first antiferromagnetic layer with a large difference during the first annealing step at 245° C., and the exchange anisotropic magnetic field of the first antiferromagnetic layer is still lower than the exchange anisotropic magnetic field of the second antiferromagnetic layer after the second annealing step at 270° C. Thus, the magnitudes of the exchange anisotropic magnetic fields of the first and second antiferromagnetic layers are not equalized.

When q+j exceeds 55.2 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

When j is less than 0.2 atomic percent, the element L cannot contribute to a sufficient improvement in the unidirectional exchange anisotropic magnetic field. When j exceeds 40 atomic percent, the unidirectional exchange anisotropic magnetic field will undesirably decrease.

Accordingly, when q and j in the first antiferromagnetic layer and the second antiferromagnetic layer satisfy the relationships (53.8 atomic percent)$\leq$(q+j)$\leq$(55.2 atomic percent) and (0.2 atomic percent)$\leq$n$\leq$(40 atomic percent), the exchange anisotropic magnetic field of the second antiferromagnetic layer becomes larger than the exchange anisotropic magnetic field of the first antiferromagnetic layer during the first annealing step, and the difference in the exchange anisotropic magnetic fields between the first antiferromagnetic layer and the second antiferromagnetic layer decreases during the second annealing step. As a result, the magnitudes of the exchange anisotropic magnetic fields of the first and second antiferromagnetic layers can be substantially equalized.

When the first antiferromagnetic layer and the second antiferromagnetic layer have different compositions, for example, when the Mn content in the first antiferromagnetic layer is higher than the Mn content in the second antiferromagnetic layer, the difference in exchange anisotropic magnetic fields after the first annealing step between the first antiferromagnetic layer and the second antiferromagnetic layer will be further increased. Thus, the magnetization vectors of the first and second antiferromagnetic layers will be securely antiparallel to each other after the second annealing step.

Accordingly, it is preferable that the first antiferromagnetic layer be composed of an alloy represented by: $X_m Mn_{100-m}$ wherein X is at least one metal selected from the group consisting of Pt, Pd, Ir, Rh, Ru and Os, and m is in a range of 52 atomic percent to 60 atomic percent, whereas the second antiferromagnetic layer be composed of an alloy represented by: $X_m Mn_{100-m}$ wherein X is at least one metal selected from the group consisting of Pt, Pd, Ir, Rh, Ru and Os, and m is in a range of 48 atomic percent to 58 atomic percent.

When m in the composition of the first antiferromagnetic layer is less than 52 atomic percent or exceeds 60 atomic percent, the crystal lattice of the $X_m Mn_{100-m}$ alloy constituting the first antiferromagnetic layer will barely change into an L10-type ordered lattice during the second annealing step at 270° C. and the alloy will not have antiferromagnetism. As a result, a unidirectional exchange anisotropic magnetic field is not achieved.

When m in the composition of the second antiferromagnetic layer is less than 48 atomic percent or exceeds 58 atomic percent, the crystal lattice of the $X_m Mn_{100-m}$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

In the second antiferromagnetic layer, m in the second antiferromagnetic layer is more preferably in a range of 52 atomic percent to 55.2 atomic percent or 56.5 atomic percent to 60 atomic percent.

When m in the second antiferromagnetic layer is less than 52 atomic percent or exceeds 60 atomic percent, the crystal lattice of the $X_m Mn_{100-m}$ alloy constituting the second antiferromagnetic layer will barely change into an L10-type ordered lattice during the second annealing step at an annealing temperature of 270° C. and the alloy will not have antiferromagnetism. As a result, a unidirectional exchange anisotropic magnetic field is not achieved.

When m in the second antiferromagnetic layer exceeds 55.2 atomic percent and is less than 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

Accordingly, when m in the second antiferromagnetic layer satisfies the relationship (52 atomic percent)$\leq$m$\leq$(55.2 atomic percent) or (56.6 atomic percent)$\leq$m$\leq$(60 atomic percent), the exchange anisotropic magnetic field of the second antiferromagnetic layer becomes larger than the exchange anisotropic magnetic field of the first antiferromagnetic layer during the first annealing step, and the magnetization vectors of the first and second pinned magnetic layers can be antiparallel to each other without deterioration of the exchange anisotropic magnetic field of the second antiferromagnetic layer while securely fixing the magnetization vector of the second pinned magnetic layer during the second annealing step.

In another preferable combination of the first and second antiferromagnetic layers, the first antiferromagnetic layer is composed of an alloy represented by the formula: $Pt_q Mn_{100-q-n} Z_n$ wherein Z is at least one element selected from the group consisting of Au, Ag, Cr, Ni, Ne, Ar, Xe and Kr, and q and n satisfy the relationships (52 atomic percent)$\leq$(q+n)$\leq$(60 atomic percent) and (0.2 atomic percent)$\leq$n$\leq$(10 atomic percent), whereas the second antiferromagnetic layer is composed of an alloy represented by the formula: $Pt_q Mn_{100-q-n} Z_n$ wherein Z is at least one element selected from the group consisting of Au, Ag, Cr, Ni, Ne, Ar, Xe and Kr, and q and n satisfy the relationships (48 atomic percent)$\leq$(q+n)$\leq$(58 atomic percent) and (0.2 atomic percent)$\leq$n$\leq$(10 atomic percent).

When q+n in the composition of the first antiferromagnetic layer is less than 52 atomic percent or exceeds 60 atomic percent, the crystal lattice of the $Pt_q Mn_{100-q-n} Z_n$ alloy constituting the first antiferromagnetic layer will barely change into an L10-type ordered lattice during the second annealing step at 270° C. and the alloy will not have antiferromagnetism. As a result, a unidirectional exchange anisotropic magnetic field is not achieved.

When n in the composition of the first antiferromagnetic layer is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

When q+n in the composition of the second antiferromagnetic layer is less than 48 atomic percent or exceeds 58 atomic percent, the crystal lattice of the $Pt_qMn_{100-q-n}Z_n$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

When n in the composition of the second antiferromagnetic layer is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

In this combination, it is preferable that q and n in the second antiferromagnetic layer satisfy the relationships (52 atomic percent)$\leq$(q+n)$\leq$(55.2 atomic percent) and (0.2 atomic percent)$\leq$n$\leq$(10 atomic percent), or (56.5 atomic percent)$\leq$(q+n)$\leq$(60 atomic percent) and (0.2 atomic percent)$\leq$n$\leq$(10 atomic percent).

When q+n in the second antiferromagnetic layer is less than 52 atomic percent or exceeds 60 atomic percent, the crystal lattice of the $Pt_qMn_{100-q-n}Z_n$ alloy constituting the second antiferromagnetic layer will barely change into an L10-type ordered lattice during the second annealing step at an annealing temperature of 270° C. and the alloy will not have antiferromagnetism. As a result, a unidirectional exchange anisotropic magnetic field is not achieved.

When q+n in the second antiferromagnetic layer exceeds 55.2 atomic percent and is less than 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

When n in the composition of the second antiferromagnetic layer is less than 0.2 atomic percent, the element Z cannot contribute to a sufficient improvement in the unidirectional exchange anisotropic magnetic field. When n exceeds 10 atomic percent, the unidirectional exchange anisotropic magnetic field will undesirably decrease.

Accordingly, when q and n in the second antiferromagnetic layer satisfy the relationships (52 atomic percent)$\leq$(q+n)$\leq$(55.2 atomic percent) or (56.6 atomic percent)$\leq$(q+n)$\leq$(60 atomic percent), and (0.2 atomic percent)$\leq$n$\leq$(10 atomic percent), the exchange anisotropic magnetic field of the second antiferromagnetic layer becomes larger than the exchange anisotropic magnetic field of the first antiferromagnetic layer during the first annealing step, and the magnetization vectors of the first and second pinned magnetic layers can be antiparallel to each other without deterioration of the exchange anisotropic magnetic field of the second antiferromagnetic layer while securely fixing the magnetization vector of the second pinned magnetic layer during the second annealing step.

In another preferable combination of the first and second antiferromagnetic layers, the first antiferromagnetic layer is composed of an alloy represented by the formula: $Pt_qMn_{100-q-j}L_j$ wherein L is at least one element selected from the group consisting of Pd, Ir, Rh, Ru and Os, and q and j satisfy the relationships (52 atomic percent)$\leq$(q+j)$\leq$(60 atomic percent) and (0.2 atomic percent)$\leq$j$\leq$(40 atomic percent), whereas the second antiferromagnetic layer is composed of an alloy represented by the formula: $Pt_qMn_{100-q-j}L_j$ wherein L is at least one element selected from the group consisting of Pd, Ir, Rh, Ru and Os, and q and j satisfy the relationships (48 atomic percent)$\leq$(q+j)$\leq$(58 atomic percent) and (0.2 atomic percent)$\leq$j$\leq$(40 atomic percent).

When q+j in the composition of the first antiferromagnetic layer is less than 52 atomic percent or exceeds 60 atomic percent, the crystal lattice of the $Pt_qMn_{100-q-j}L_j$ alloy constituting the first antiferromagnetic layer will barely change into an L10-type ordered lattice during the second annealing step at 270° C. and the alloy will not have antiferromagnetism. As a result, a unidirectional exchange anisotropic magnetic field is not achieved.

When j in the composition of the first antiferromagnetic layer is less than 0.2 atomic percent, the element L cannot contribute to a sufficient improvement in the unidirectional exchange anisotropic magnetic field. When j exceeds 40 atomic percent, the unidirectional exchange anisotropic magnetic field will undesirably decrease.

When q+j in the composition of the second antiferromagnetic layer is less than 48 atomic percent or exceeds 58 atomic percent, the crystal lattice of the $Pt_qMn_{100-q-j}L_j$ alloy constituting the second antiferromagnetic layer will barely change into an L10-type ordered lattice during the first annealing step at 245° C. and the alloy will not have antiferromagnetism. As a result, a unidirectional exchange anisotropic magnetic field is not achieved.

When j in the composition of the second antiferromagnetic layer is less than 0.2 atomic percent, the element Z cannot contribute to a sufficient improvement in the unidirectional exchange anisotropic magnetic field. When n exceeds 40 atomic percent, the unidirectional exchange anisotropic magnetic field will undesirably decrease.

In this combination, it is preferable that q and j in the second antiferromagnetic layer satisfy the relationships (52 atomic percent)$\leq$(q+j)$\leq$(55.2 atomic percent) and (0.2 atomic percent)$\leq$j$\leq$(40 atomic percent), or (56.5 atomic percent)$\leq$(q+j)$\leq$(60 atomic percent) and (0.2 atomic percent)$\leq$j$\leq$(40 atomic percent).

When q+j in the second antiferromagnetic layer is less than 52 atomic percent or exceeds 60 atomic percent, the crystal lattice of the $Pt_qMn_{100-q-j}L_j$ alloy constituting the second antiferromagnetic layer will barely change into an L10-type ordered lattice during the second annealing step at an annealing temperature of 270° C. and the alloy will not have antiferromagnetism. As a result, a unidirectional exchange anisotropic magnetic field is not achieved.

When q+j in the second antiferromagnetic layer exceeds 55.2 atomic percent and is less than 56.5 atomic percent, the exchange anisotropic magnetic field of the second antiferromagnetic layer becomes larger than the exchange anisotropic magnetic field of the first antiferromagnetic layer during the first annealing step at an annealing temperature of 245° C. The difference in exchange anisotropic magnetic fields, however, is slight. Thus, the second pinned magnetic layer may be magnetized in the same direction as the magnetization vector of the first pinned magnetic layer during the second annealing step at an annealing temperature of 270° C. Moreover, the magnetization vector of the first pinned magnetic layer will be barely fixed in a direction antiparallel to the magnetization vector of the second pinned magnetic layer during the second annealing step.

When j in the composition of the second antiferromagnetic layer is less than 0.2 atomic percent, the element Z cannot contribute to a sufficient improvement in the unidirectional exchange anisotropic magnetic field. When j exceeds 40 atomic percent, the unidirectional exchange anisotropic magnetic field will undesirably decrease.

Accordingly, when q and j in the second antiferromagnetic layer satisfy the relationships (52 atomic percent)$\leq$(q+j)$\leq$(55.2 atomic percent) or (56.6 atomic percent)$\leq$(q+j)$\leq$(60 atomic percent), and (0.2 atomic percent)$\leq$j$\leq$(40 atomic percent), the exchange anisotropic magnetic field of the second antiferromagnetic layer becomes larger than the exchange anisotropic magnetic field of the first antiferromagnetic layer during the first annealing step, and the magnetization vectors of the first and second pinned magnetic layers can be antiparallel to each other without deterioration of the exchange anisotropic magnetic field of the second antiferromagnetic layer while securely fixing the magnetization vector of the second pinned magnetic layer during the second annealing step.

In the above spin-valve thin-film magnetic element 1, vectors of dipolar magnetic fields $H_{d1}$ and $H_{d2}$ leaking from the first and second pinned magnetic layers 49 and 42, respectively, are antiparallel to each other in the free magnetic layer 44, and repel each other in the free magnetic layer 44. Thus, the magnetization vector $H_f$ of the free magnetic layer 44 is not affected by the magnetization vectors of the first and second pinned magnetic layers 49 and 42, respectively, and does not tilt. Accordingly, the free magnetic layer 44 can be readily biased. As a result, an orthogonal arrangement between the magnetization vector of the free magnetic layer 44 and the magnetization vectors of the first and second pinned magnetic layers 49 and 42, respectively, can be readily achieved, and the asymmetry of the spin-valve thin-film magnetic element 1 can be reduced.

The dipolar magnetic field $H_{d1}$ leaking from the first pinned magnetic layer 49 enters the second pinned magnetic layer 42, whereas the dipolar magnetic field $H_{d2}$ leaking from the second pinned magnetic layer 42 enters the first pinned magnetic layer 49. Since the first and second pinned magnetic layers 49 and 42, respectively, are magnetically coupled with each other, the magnetization vectors of these layers are not substantially affected and do not change by the external magnetic field. Thus, the spin-valve thin-film magnetic element has high thermal stability.

The alloy used in the first and second antiferromagnetic layers comprises Mn and at least one element selected from Pt, Pd, Ir, Rh, Ru, Os, Au, Ag, Cr, Ni, Ne, Ar, Xe and Kr. This alloy can generate a sufficiently large magnitude of exchange anisotropic magnetic field to securely fix the magnetization vectors of the first and second pinned magnetic layers 49 and 42, respectively. Since the exchange anisotropic magnetic field has excellent temperature characteristics, the spin-valve thin-film magnetic element has superior linear response in magnetoresistive effects.

In the above method for making the spin-valve thin-film magnetic element, the first annealing step fixes the magnetization vector of the second pinned magnetic layer 42 and the second annealing step fixes the magnetization vector of the first pinned magnetic layer 49. Thus, the magnetization vectors of the first and second pinned magnetic layers 49 and 42, respectively, can be independently fixed in appropriate directions. In particular, the magnetization vectors of the first magnetic field at the first annealing step and the second magnetic field at the second annealing step are set to be antiparallel to each other so that the magnetization vectors of the first and second pinned magnetic layers 49 and 42, respectively, are fixed in antiparallel to each other.

A second embodiment of the present invention will now be described with reference to FIGS. 10 and 11.

Figure 10:
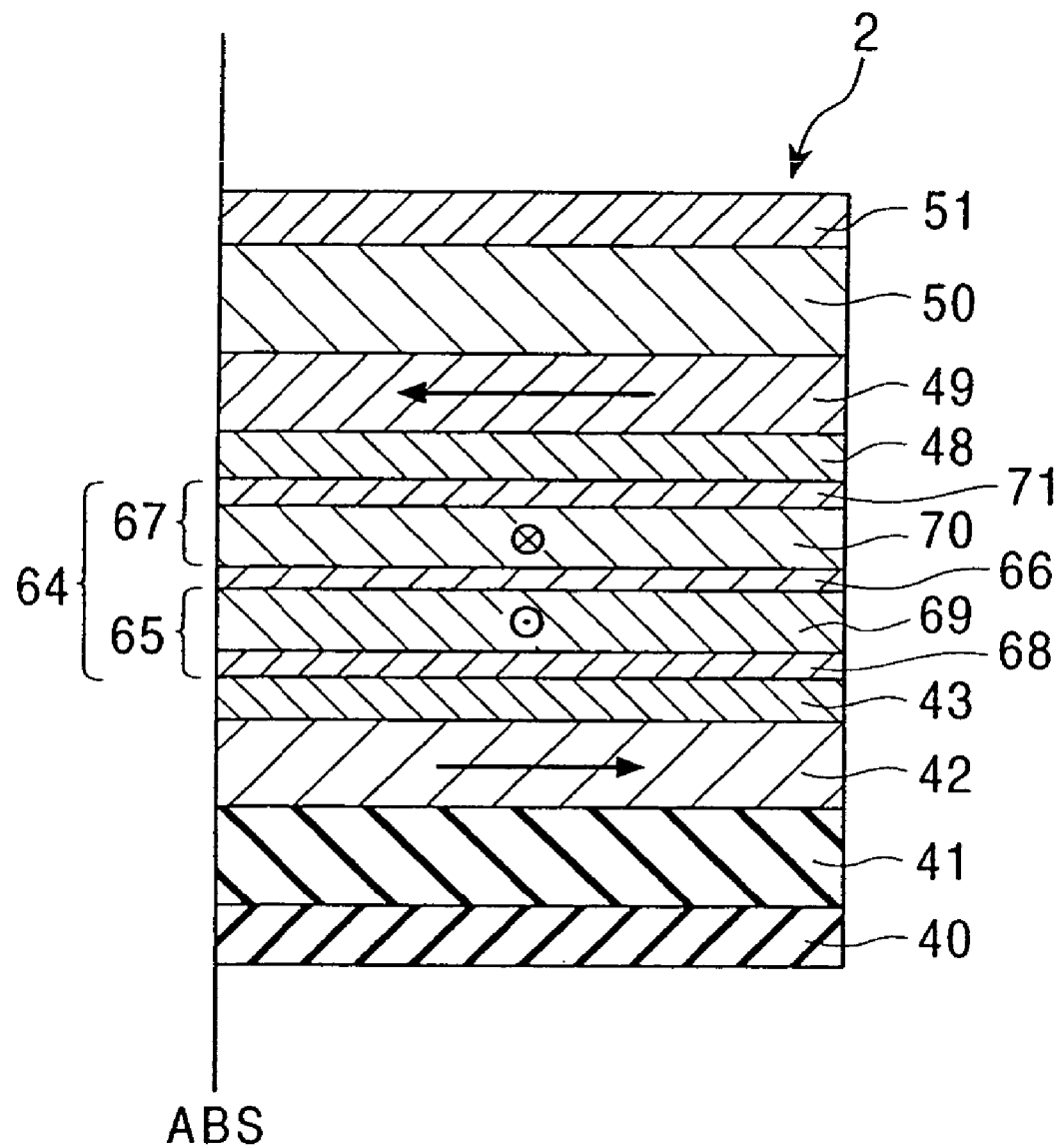
FIG. 10 is a cross-sectional view of a spin-valve thin-film magnetic element in accordance with a second embodiment of the present invention.
Figure 11:
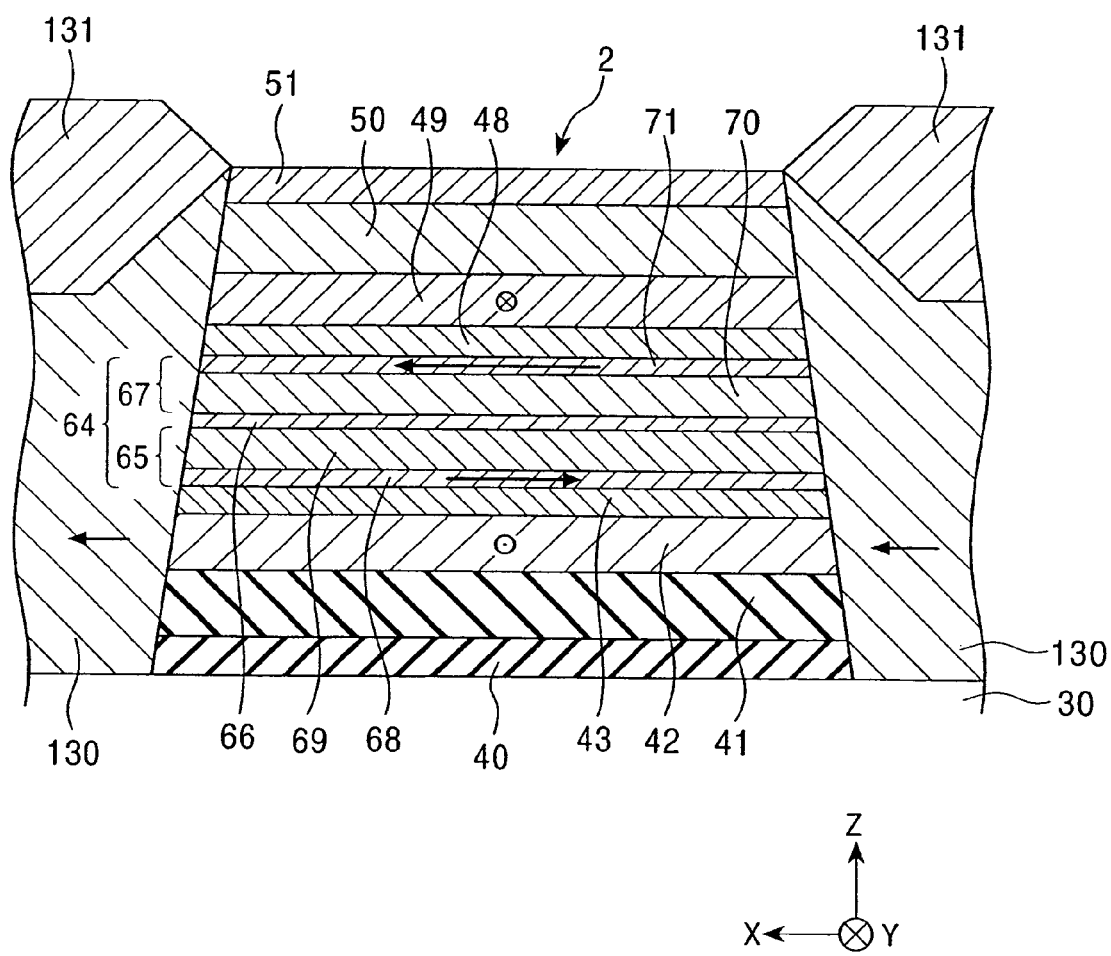
FIG. 11 is a cross-sectional view from another direction of the spin-valve thin-film magnetic element in FIG. 10.
Figure 12:
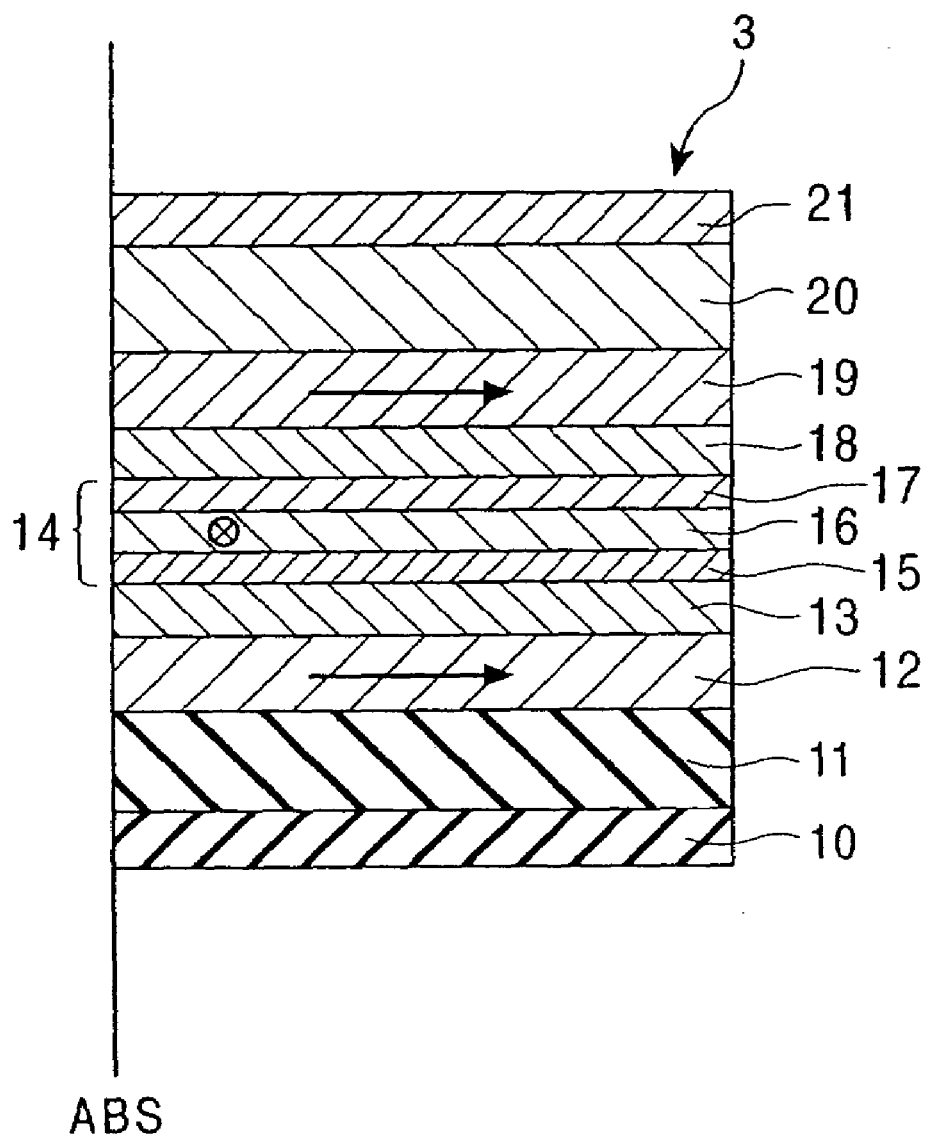
FIG. 12 is a cross-sectional view of a conventional spin-valve thin-film magnetic element.
Figure 13:
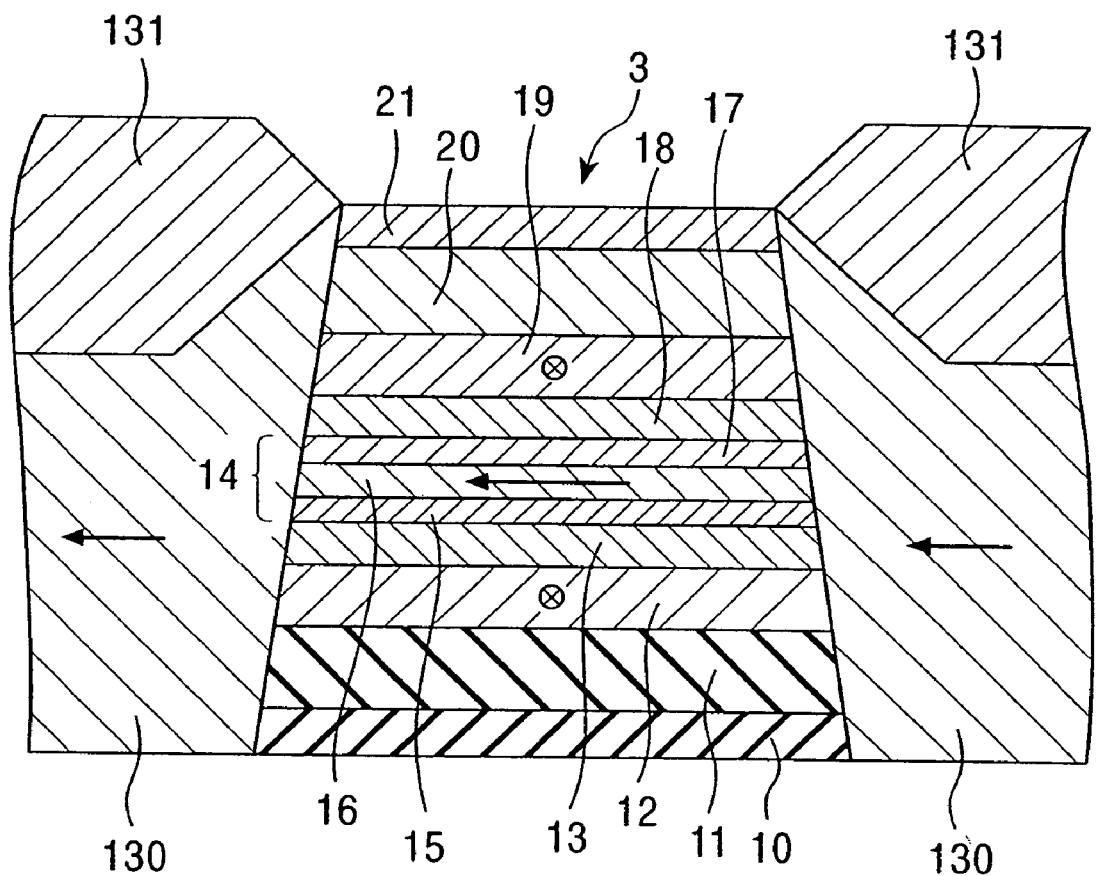
FIG. 13 is a cross-sectional view from another direction of the conventional spin-valve thin-film magnetic element in FIG. 12.
Figure 14:
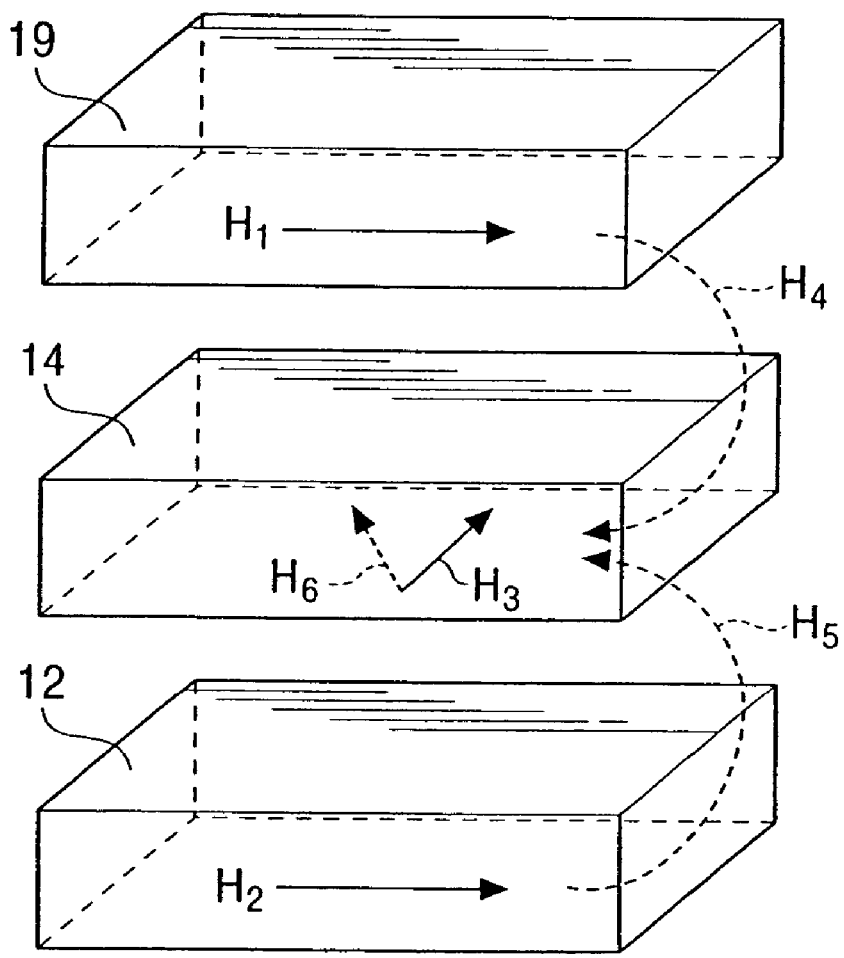
FIG. 14 is a schematic view showing the magnetization vectors of pinned magnetic layers and a free magnetic layer in a conventional spin-valve thin-film magnetic element.
Figure 14:
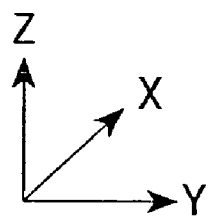

FIGS. 10 and 11 show a spin-valve thin-film magnetic element 2 as a second embodiment in accordance with the present invention. In these drawings, constituents having the same functions as in FIGS. 1 and 2 are referred to with the same numerals, and a detailed description thereof has been omitted.

The spin-valve thin-film magnetic element 2 is a dual spin-valve thin-film magnetic element including a free magnetic layer, which is composed of first and second sublayers separated by a nonmagnetic interlayer, in which a nonmagnetic conductive layer, a pinned magnetic layer, and an antiferromagnetic layer are deposited on each of the upper and lower surfaces of the free magnetic layer.

With reference to FIGS. 10 and 11, the spin-valve thin-film magnetic element 2 is a laminate including, from the bottom, a substrate 30, an underlying layer 40, a second antiferromagnetic layer 41, a second pinned magnetic layer 42, a nonmagnetic conductive layer 43, a free magnetic layer 64 composed of a second free magnetic sublayer 65, a nonmagnetic interlayer 66, and a first free magnetic sublayer 67, a nonmagnetic conductive layer 48, a first pinned magnetic layer 49, a first antiferromagnetic layer 50, and a protective layer 51.

As shown in FIG. 11, biasing layers 130 and conductive layers 131 are formed on both sides of the laminate over the underlying layer 40 to the protective layer 51.

The first free magnetic sublayer 67 and the second free magnetic sublayer 65 have different thicknesses.

The first and second pinned magnetic layers 49 and 42, respectively, are composed of, for example, metallic Co, a NiFe alloy, a CoNiFe alloy, or a CoFe alloy.

The underlying layer 40 is composed of a nonmagnetic material such as Ta, the nonmagnetic conductive layers 43 and 48 are composed of a nonmagnetic conductive film such as Cu, and the protective layer 51 is composed of a nonmagnetic material such as Ta.

The nonmagnetic interlayer 66 disposed between the first and second free magnetic sublayers 67 and 65, respectively, is preferably formed of at least one metal selected from Ru, Rh, Ir, Cr, Re and Cu.

The first and second antiferromagnetic layers 50 and 41, respectively, are formed of an alloy containing Mn and at least one element selected from Pt, Pd, Ir, Rh, Ru, Os, Au, Ag, Cr, Ni, Ne, Ar, Xe and Kr. These layers magnetize the first and second pinned magnetic layers 49 and 42, respectively, in predetermined directions by exchange anisotropic magnetic fields at interfaces to the first and second pinned magnetic layers 49 and 42, respectively, during annealing in a magnetic field.

As shown in FIG. 10, the first free magnetic sublayer 67 and the second free magnetic sublayer 65 each have double layer configurations. That is, the first free magnetic sublayer 67 has an outer Co film component 71 in contact with the nonmagnetic conductive layer 48 and an inner component 70 in contact with the nonmagnetic interlayer 66. Also, the second free magnetic sublayer 65 has an outer Co film component 68 in contact with the nonmagnetic conductive layer 43 and an inner component 69 in contact with the nonmagnetic interlayer 66. These inner components 70 and 69 are formed of, for example, a NiFe alloy, a CoFe alloy, or a CoNiFe alloy.

Since the outer layers 68 and 71 in contact with the nonmagnetic conductive layers 43 and 48, respectively, are formed of Co, the rate of change of resistance can be increased and mutual diffusion between the inner component 70 and the nonmagnetic conductive layer 48 and between the inner layers 69 and the nonmagnetic conductive layer 43 can be prevented.

The first and second pinned magnetic layers 49 and 42, respectively, are in contact with the first and second antiferromagnetic layers 50 and 41, respectively. When these are annealed in a magnetic field, first and second pinned magnetic layers 49 and 42, respectively, are magnetized by exchange anisotropic magnetic fields due to exchange coupling at the interfaces between the first pinned magnetic layer 49 and the first antiferromagnetic layer 50 and between the second pinned magnetic layer 42 and the second antiferromagnetic layer 41, respectively.

The magnetization vector of the first pinned magnetic layer 49 is fixed in a direction opposite to the Y direction in the drawing towards the recording medium, whereas the magnetization vector of the second pinned magnetic layer 42 is fixed in the Y direction or height direction away from the recording medium. Thus, the magnetization vectors of the first and second pinned magnetic layers 49 and 42, respectively, are antiparallel to each other.

In the free magnetic layer 64, the magnetization vector of the first free magnetic sublayer 67 is fixed in the X direction by the magnetic flux from the biasing layers 130, whereas the magnetization vector of the second free magnetic sublayer 65 is fixed in the opposite direction to the X direction. The second free magnetic sublayer 65 is magnetically coupled with the first free magnetic sublayer 67 by an exchange anisotropic magnetic field or by a RKKY (Rudemann, Kittel, Kasuya and Yoshida) interaction and is magnetized in the opposite direction to the X direction. The magnetization vectors of the first and second free magnetic sublayers 67 and 65, respectively, are reversible while maintaining ferrimagnetism by the effect of an external magnetic field.

Since the thickness of the first free magnetic sublayer 67 is larger than the thickness of the second free magnetic sublayer 65, the first free magnetic sublayer 67 has a larger magnetic moment represented by the product of the magnitude of magnetization and the thickness of the layer. The overall free magnetic layer 64 has a magnetization vector in the X direction as a synthesized moment of the first free magnetic sublayer 67 and the second free magnetic sublayer 65.

In the spin-valve thin-film magnetic element 2 shown in FIGS. 10 and 11, the magnetization of the first free magnetic sublayer 67 and the magnetization of the second free magnetic sublayer 65 affect the rate of change of resistance. The electrical resistance of the element changes according to the relationship between variable magnetization of the first and second free magnetic sublayers 67 and 65, respectively, and fixed magnetization of the first and second pinned magnetic layers 49 and 42, respectively. In order to achieve a large rate of change of resistance in the dual spin-valve thin-film magnetic element, the magnetization vectors of the first and second pinned magnetic layers 49 and 42, respectively, are controlled so that the resistance of the first free magnetic sublayer 67 and the first pinned magnetic layer 49 and the resistance of the second free magnetic sublayer 65 and the second pinned magnetic layer 42 have the same change rate. In an optimized control, when the rate of change of resistance of the first free magnetic sublayer 67 and the first pinned magnetic layer 49 is maximized, the rate of change of resistance of the second free magnetic sublayer 65 and the second pinned magnetic layer 42 is also maximized, and when the rate of change of resistance of the first free magnetic sublayer 67 and the first pinned magnetic layer 49 is minimized, the rate of change of resistance of the second free magnetic sublayer 65 and the second pinned magnetic layer 42 is also minimized.

In the spin-valve thin-film magnetic element 2 shown in FIGS. 10 and 11, the magnetization vectors of the first and second free magnetic sublayers 67 and 65, respectively, are antiparallel to each other and the magnetization vectors of the first and second pinned magnetic layers 49 and 42, respectively, are opposite to each other. Thus, a large rate of change of resistance is obtainable.

The spin-valve thin-film magnetic element 2 can be produced by the same method as that for the above spin-valve thin-film magnetic element 1. As shown in FIGS. 10 and 11, the underlying layer 40 to the protective layer 51 are deposited in that order, and then, as shown in FIG. 6, the laminate is annealed at a first annealing temperature $T_{a1}$ while applying a first magnetic field $H_{a1}$ in the Y direction so that exchange anisotropic magnetic fields $H_{p1}'$ and $H_{p2}$ are generated in the first and second antiferromagnetic layers 41 and 50, respectively (see FIGS. 1 and 2). Thus, the magnetization vectors of the first and second pinned magnetic layers 49 and 42, respectively, are fixed in the Y direction and the exchange anisotropic magnetic field $H_{p2}$ of the second antiferromagnetic layer 41 becomes larger than the exchange anisotropic magnetic field $H_{p1}'$ of the first antiferromagnetic layer 50.

With reference to FIG. 7, the laminate is annealed at a second annealing temperature $T_{a2}$ higher than the first annealing temperature $T_{a1}$ while applying a second magnetic field $H_{a2}$ in a direction opposite to the Y direction to change the exchange anisotropic magnetic field of the first antiferromagnetic layer 49 from $H_{p1}'$ to $H_{p1}$ and to fix the magnetization vector of the first pinned magnetic layer 49 in a direction opposite to the Y direction.

The spin-valve thin-film magnetic element 2 of the second embodiment has the same advantages as that of the spin-valve thin-film magnetic element 1 of the first embodiment. In addition, the magnetization vectors of the first and second free magnetic sublayers 67 and 65, respectively, are antiparallel to each other by an exchange anisotropic magnetic field (a RKKY interaction) generated between the first and second free magnetic sublayers 67 and 65, respectively. The magnetization vectors of the first and second free magnetic sublayers 67 and 65, respectively, are reversible while maintaining ferrimagnetism by the effect of an external magnetic field. As a result, the spin-valve thin-film magnetic element 2 has a greater rate of change of resistance.

What is claimed is:

1. A method for making a spin-valve thin-film magnetic element comprising:
   forming a laminate on a substrate, the laminate comprising a free magnetic layer, two nonmagnetic conductive layers formed on two surfaces of the free magnetic layer, first and second pinned magnetic layers adjoining the two nonmagnetic conductive layers, respectively, and first and second antiferromagnetic layers adjoining the first and second pinned magnetic layers, respectively, the first and second antiferromagnetic layers comprising Mn and at least one element selected from the group consisting of Pt, Pd, Ir, Rh, Ru, Os, Au, Ag, Cr, Ni, Ne, Ar, Xe and Kr, the second antiferromagnetic layer is more proximate to the substrate than the first antiferromagnetic layer;

annealing the laminate at a first annealing temperature while applying a first magnetic field to generate exchange anisotropic magnetic fields in the first and second antiferromagnetic layers such that magnetization vectors of the first and second pinned magnetic layers are fixed in the same direction and such that an exchange anisotropic magnetic field of the second antiferromagnetic layer is larger than an exchange anisotropic magnetic field of the first antiferromagnetic layer; and annealing the laminate at a second annealing temperature higher than the first annealing temperature, while applying a second magnetic field, which is antiparallel to the first magnetic field, to fix the magnetization vector of the first pinned magnetic layer in a direction which is antiparallel to the magnetization vector of the second pinned magnetic layer.

2. A method for making a spin-valve thin-film magnetic element according to claim 1, further comprising setting a magnitude of the second magnetic field to be greater than that of the exchange anisotropic magnetic field of the first antiferromagnetic layer generated by the first annealing and less than that of the exchange anisotropic magnetic field of the second antiferromagnetic layer generated by the first annealing.

3. A method for making a spin-valve thin-film magnetic element according to claim 1, further comprising setting the first annealing temperature to be in a range of 220° C. to 250° C.

4. A method for making a spin-valve thin-film magnetic element according to claim 1, further comprising setting the second annealing temperature to be in a range of 250° C. to 270° C.

* * * * *

UNITED STATES PATENT AND TRADEMARK OFFICE
CERTIFICATE OF CORRECTION

PATENT NO. : 7,150,092 B2
APPLICATION NO. : 10/617010
DATED : December 19, 2006
INVENTOR(S) : Hasegawa Page 1 of 1

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (517) days Delete the phrase "by 517" and insert -- by 452 days --

Signed and Sealed this

Ninth Day of December, 2008

JON W. DUDAS
*Director of the United States Patent and Trademark Office*